US009724626B2

(12) United States Patent
Neumann

(10) Patent No.: US 9,724,626 B2
(45) Date of Patent: Aug. 8, 2017

(54) CONTIGUOUS FILTER PRESS AND METHODS OF MANUFACTURING THE SAME

(71) Applicant: FLSmidth A/S, Valby (DK)

(72) Inventor: Reuben Neumann, West Jordan, UT (US)

(73) Assignee: FLSMIDTH A/S, Valby (DK)

( * ) Notice: Subject to any disclaimer, the term of this patent is extended or adjusted under 35 U.S.C. 154(b) by 645 days.

(21) Appl. No.: 14/351,950

(22) PCT Filed: Oct. 19, 2012

(86) PCT No.: PCT/US2012/060965
§ 371 (c)(1),
(2) Date: Apr. 15, 2014

(87) PCT Pub. No.: WO2013/059556
PCT Pub. Date: Apr. 25, 2013

(65) Prior Publication Data
US 2014/0299534 A1 Oct. 9, 2014

Related U.S. Application Data

(60) Provisional application No. 61/548,954, filed on Oct. 19, 2011.

(51) Int. Cl.
B01D 25/21 (2006.01)
B01D 25/164 (2006.01)

(52) U.S. Cl.
CPC ......... *B01D 25/215* (2013.01); *B01D 25/164* (2013.01); *Y10T 29/49826* (2015.01)

(58) Field of Classification Search
CPC ............... B01D 25/215; B01D 25/164; Y10T 29/49826

(Continued)

(56) References Cited

U.S. PATENT DOCUMENTS 607,723 A 7/1898 Wilson
612,327 A 10/1898 Furnival
(Continued)

FOREIGN PATENT DOCUMENTS

EP 1 628 731 B1 B1 8/2008

OTHER PUBLICATIONS

The International Search Report and Written Opinion dated Jan. 3, 2013, 9 pages.

Primary Examiner — Madeline Gonzalez
(74) Attorney, Agent, or Firm — Jeffrey A. Sharp

(57) ABSTRACT

A horizontal filter press is disclosed. The horizontal filter press comprises a support bracket, a head bracket, two sidebars spanning a distance between said support bracket and said head bracket, and a plurality of double filter plates. Each double filter plate comprises a first individual filter plate having a first filter chamber, one or more first filtrate ports, at least one first feed eye port, and at least one first handle; and a second individual filter plate having a second filter chamber, one or more second filtrate ports, at least one second feed eye port, and at least one second handle. The first and second individual filter plates are initially separate components, but are subsequently mechanically joined together to form said at least one double filter plate. In some embodiments a spacer bar is provided between the first and second individual filter plates. In some embodiments, a cutout is provided between the first and second individual filter plates to accommodate a support beam centrally disposed between said sidebars, the support beam providing additional support to the plurality of double filter plates. Methods of manufacturing a double filter plate are also disclosed.

6 Claims, 22 Drawing Sheets

(58) Field of Classification Search
USPC .................. 210/224–231, 331, 346, 486, 347
See application file for complete search history.

(56) References Cited

U.S. PATENT DOCUMENTS

| | | | |
|---|---|---|---|
| 652,664 A | 6/1900 | Burr et al. | |
| 905,341 A | 12/1908 | Merrill | |
| 912,867 A | 2/1909 | Merrill | |
| 1,138,251 A | 5/1915 | Schaefer | |
| 2,107,805 A | 2/1938 | Russell et al. | |
| 2,399,471 A | 4/1946 | Daniel et al. | |
| 2,407,303 A | 9/1946 | Teale | |
| 2,417,958 A | 3/1947 | Teale | |
| 3,018,894 A | 1/1962 | Brown | |
| 3,499,532 A | 3/1970 | Schneider | |
| 3,669,267 A | 6/1972 | Hutton | |
| 4,217,224 A * | 8/1980 | Fismer ................. | B01D 25/215 210/231 |
| 4,343,710 A | 8/1982 | Shackleton et al. | |
| 4,479,426 A | 10/1984 | Olenfalk | |
| 4,587,015 A * | 5/1986 | Busse ..................... | B01D 25/19 100/195 |
| 4,891,117 A | 1/1990 | Gardner, Sr. | |
| 5,484,526 A * | 1/1996 | Bonn .................... | B01D 25/215 100/211 |
| 5,672,272 A | 9/1997 | Baer | |
| 5,851,387 A | 12/1998 | Neumann | |
| 7,396,472 B2 * | 7/2008 | Duby ................... | B01D 25/164 210/224 |
| 7,641,804 B2 | 1/2010 | Thalmann et al. | |
| 7,790,027 B2 | 9/2010 | Hermann | |

* cited by examiner

| FILTER PLATE SIZE | Single Filter Plate<br><br>One 2.0m x 2.0m Plate<br><br>(PRIOR ART) | Single Filter Plate<br><br>One 2.5m x 2.5m Plate<br><br>(PRIOR ART) | Double Filter Plate<br><br>Two 2.0m x 2.0m Individual Plates | Double Filter Plate<br><br>Two 2.5m x 2.0m Individual Plates | Double Filter Plate<br><br>Two 2.5m x 2.5m individual Plates |
|---|---|---|---|---|---|
| CAPACITY (1000 METRIC TONNES PER DAY) | 155.7 | 154.7 | 156.1 | 160.4 | 160.8 |
| # REQUIRED FILTER PLATES PER PRESS | 42 | 26 | 23 | 18 | 14 |
| # FILTER PRESSES NEEDED | 39 | 23 | 21 | 16 | 13 |
| FILTRATION AREA ($m^2$) | 1020 | 1625 | 2080 | 2600 | 3250 |
| FILTER VOLUME ($m^3$) | 24.3 | 25.7 | 31.3 | 42.1 | 51.5 |
| DISCHARGED FILTER CAKE (METRIC TONNES) | 37.0 | 39.2 | 47.6 | 64.0 | 78.3 |
| # HYDRAULIC POWER PACKS | 36 | 26 | 23 | 18 | 14 |
| # SLURRY PUMPS PER SYSTEM | 42 | 26 | 23 | 18 | 18 |

FIG. 32

CONTIGUOUS FILTER PRESS AND METHODS OF MANUFACTURING THE SAME

BACKGROUND OF THE INVENTION

This invention relates to filtering equipment and more particularly to filter press systems used, for instance, in the mining, agricultural, waste management, food, chemical, pharmaceutical industries, pulp and paper industries.

Filter presses (also called "plate-and-frame", "chamber", "membrane", or "membrane plate" filter presses) separate liquids and solids by forcing the liquid fraction of a feed slurry through a permeable filter cloth. The separation takes place in chambers formed between the recessed faces of plates, which have been clamped together in a rugged steel frame. The molded filter plates are formed with corrugated drainage surfaces in the chamber recesses, and ports are provided for slurry feed and filtrate drainage. Each face is covered with a filter cloth and the plates are clamped together using a hydraulic ram. Slurry is pumped in under high pressure, filling the chambers with solids and pushing liquid out through the filter cloth. When no more solids can be forced into chambers, the feed pumps are turned off and compressed air or steam is used to remove interstitial water from pores in the formed filter cake. When the desired residual moisture content has been achieved, the filter is opened, cake is removed by gravity, and the procedure is repeated.

Additions to the basic filtration cycle may include the removal of residual slurry from the feed channel with compressed air and/or water, air purging of filtrate drain channels, and cake or filter cloth washing to remove soluble impurities. Very high solids concentrations can be achieved in cakes of low permeability through the use of filter plates lined with optional elastomeric membranes. After the basic filtration cycle has been completed, these membranes are inflated with pressurized air or liquid, squeezing additional moisture from the filter cake.

Many processes in the food, chemical or pharmaceutical industries make products from liquid-solid suspensions or slurries which contain solids which do not dissolve and are suspended in the liquid fraction. Filter presses separate the solids from the liquids so that the useful part can be processed, packaged or delivered to the next step.

Filter presses generally work in a "batch" manner. After filter case is removed from the press, it is re-loaded with slurry and the filtering cycle repeated. Typically, filter presses use pressures capable of producing filter cakes having water content under 25%. Filter chambers may comprise square, rectangular, or round filter plates supported in a frame. Once the filter chambers are loaded with slurry, the filter plates are forced together with hydraulic rams that generate pressures around 225 pounds per square inch (approximately 1,551,000 Pascal).

Formed filter cake further enhances removal of fine particles in the introduced slurry and therefore contributes to filtrate clarity. Filtrate can be drained away for safe disposal, or it can be kept in a water tank for recycled use. At the end of filtration, solid filter cakes are removed by gravity as the plates are separated. In some designs shaker mechanisms are used to shed and break up the filter cake. The whole filtration process is often controlled by electronics and operated automatically or semi-automatically.

Due to the large number of plates per machine, high pressures involved, and unpredictability of mechanical and dynamic slurry feed properties, manufacturers are currently limited in the achievable output tonnages per filter press. Moreover, state-of-the-art manufacturing processes limit the size of each plate to a maximum of 3200 mm by 2400 mm.

OBJECTS OF THE INVENTION

It is, therefore, an object of the invention to provide an improved filter press which is configured to double the throughput tonnages of conventional pressure filters.

It is another object of the invention to reduce the floor space area footprint by achieving a given throughput tonnage with a lesser number of filter press machines.

Yet another object of the invention is to prevent or minimize machine downtime, capital costs, manufacturing costs, and maintenance costs.

Another object of the invention is to provide modularity to a filter plate so that only a portion of the filter plate can be replaced with a new portion, at a fraction of the cost of a new filter plate.

These and other objects of the invention will be apparent from the drawings and description herein. Although every object of the invention is believed to be attained by at least one embodiment of the invention, there is not necessarily any one embodiment of the invention that achieves all of the objects of the invention.

SUMMARY OF THE INVENTION

A double filter plate comprises a first individual filter plate having a filter chamber, one or more filtrate ports, at least one feed eye port, and at least one handle. The double filter plate further comprises a second individual filter plate having a filter chamber, one or more filtrate ports, at least one feed eye port, and at least one supporting handle. The first and second individual filter plates are initially separate components which are subsequently mechanically joined together to form said double filter plate. The double filter plate may comprise one or more rollers or slides which are centrally located proximate an area between the first and second individual filter plates. The double filter plate may comprise one or more spacer bars between said first and second individual filter plates. The first and second individual filter plates and the one or more spacer bars may initially be separate components, which are subsequently mechanically joined together to form said double filter plate. Spacer bars may be shorter in height than the first and second individual filter plates, thereby creating a cutout which is sized to receive a support beam. The spacer bars may be provided with a filtering area having one or more filtration features. In some embodiments, filtration features may include a filtrate port, a filter chamber, a stay boss, a recess, a channel, a groove, a dimpled or undulating surface, or combinations thereof.

A horizontal filter press is also disclosed. The horizontal filter press comprises a support bracket, a head bracket, two sidebars spanning a distance between said support bracket and said head bracket, and at least one double filter plate comprising a first individual filter plate having a filter chamber, one or more filtrate ports, at least one feed eye port, and at least one handle; and a second individual filter plate having a filter chamber, one or more filtrate ports, at least one feed eye port, and at least one handle. The first and second individual filter plates may initially be separate components which are subsequently mechanically joined together to form the at least one double filter plate. The horizontal filter press further comprises a support beam centrally disposed between said sidebars and supporting the at least one double filter plate. Each of the one or more double filter plates may comprise one or more rollers or slides which are centrally located proximate an area between the first and second individual filter plates and are configured to contact the support beam. Each double filter plate may comprise one or more spacer bars between said first and second individual filter plates. The first and second individual filter plates and the one or more spacer bars may initially be separate components which are subsequently mechanically joined together to form said at least one double filter plate. The one or more spacer bars may be shorter in height than the first and second individual filter plates, thereby creating a cutout which is sized to receive the support beam. In some embodiments, spacer bars may comprise a filtering area having one or more filtration features including filtrate ports, filter chambers, stay bosses, recesses, channels, grooves, dimpled or undulating surfaces configured to support filter cloth, and combinations thereof.

A method of manufacturing a double filter plate is also disclosed. The method comprises providing a first separate individual filter plate having a first filter chamber, one or more first filtrate ports, at least one feed eye port, and at least one handle; providing a second separate individual filter plate having a filter chamber, one or second filtrate ports, at least one feed eye port, and at least one handle; and mechanically joining the first and second individual filter plates together, wherein the first and second individual filter plates are initially separate components which are subsequently mechanically joined together to form a double filter plate. In some instances, the method includes the step of providing one or more rollers or slides centrally to the double filter plate, proximate an area between the first and second individual filter plates. In other instances, the method includes the step of providing one or more spacer bars between said first and second individual filter plates; wherein the first and second individual filter plates and the one or more spacer bars are initially separate components which are subsequently mechanically joined together to form said double filter plate. The method may comprise providing a cutout to a central portion of the double filter plate which is configured to accommodate a support beam. In some embodiments, the method includes providing a filtering area to the one or more spacer bars, wherein the filtering area may comprise one or more filtration features including a filtrate port, a filter chamber, a stay boss, a recess, a channel, a groove, a dimpled or undulating surface configured to support filter cloth, and combinations thereof.

BRIEF DESCRIPTION OF THE DRAWINGS

FIGS. 19 and 20 show an embodiment of a double filter plate and horizontal filter press wherein a central support beam is provided to and captured within a central area of the plate, in addition to lateral sidebars;

FIG. 32 is a table showing performance improvements over conventional horizontal filter presses;

DETAILED DESCRIPTION OF THE INVENTION

Figure 1:
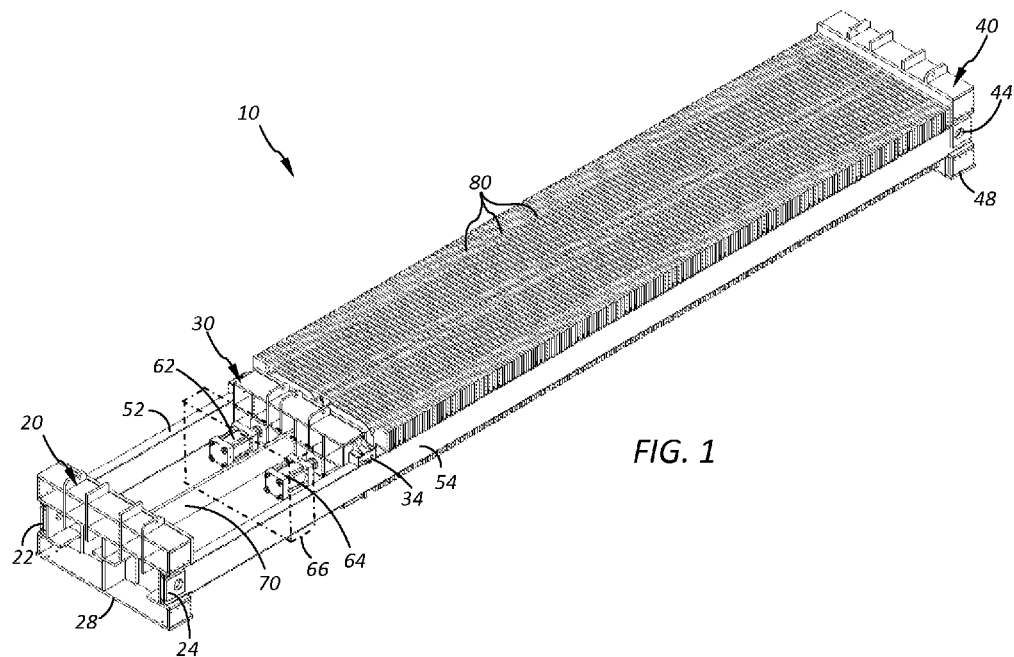
FIGS. 1-3 illustrate various views of a horizontal filter press according to some embodiments.
Figure 2:
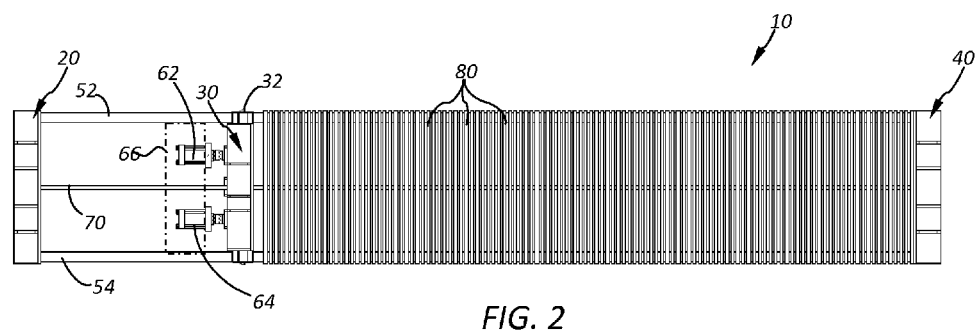
Figure 3:
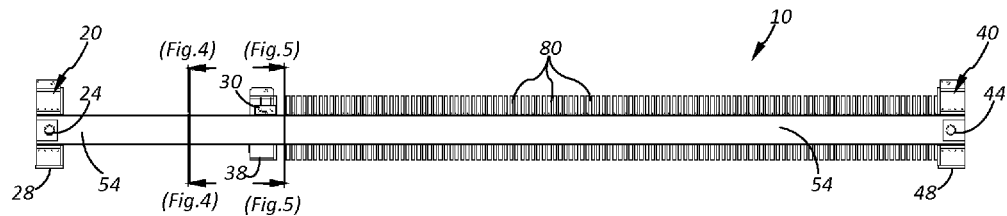
Figure 4:
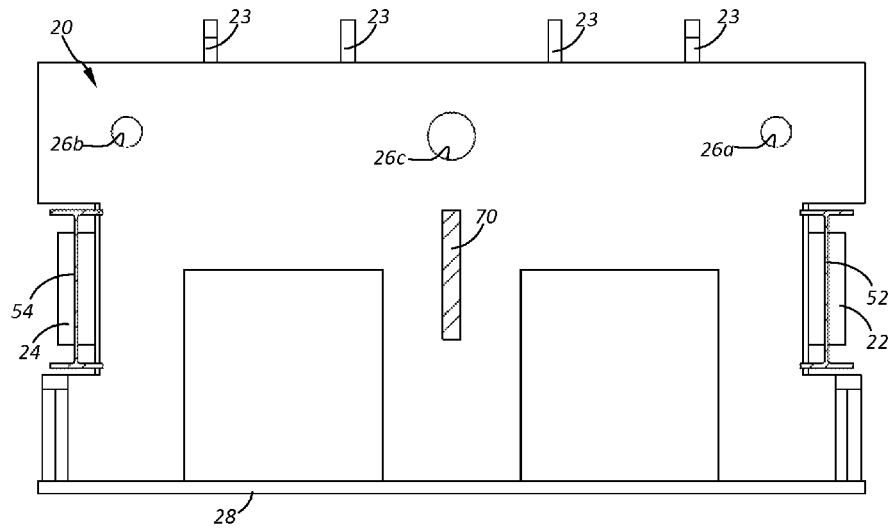
FIG. 4 is a transverse cross-sectional view of the horizontal filter press shown in FIGS. 1-3, as viewed from the section line shown in FIG. 3, showing a support bracket.
Figure 5:
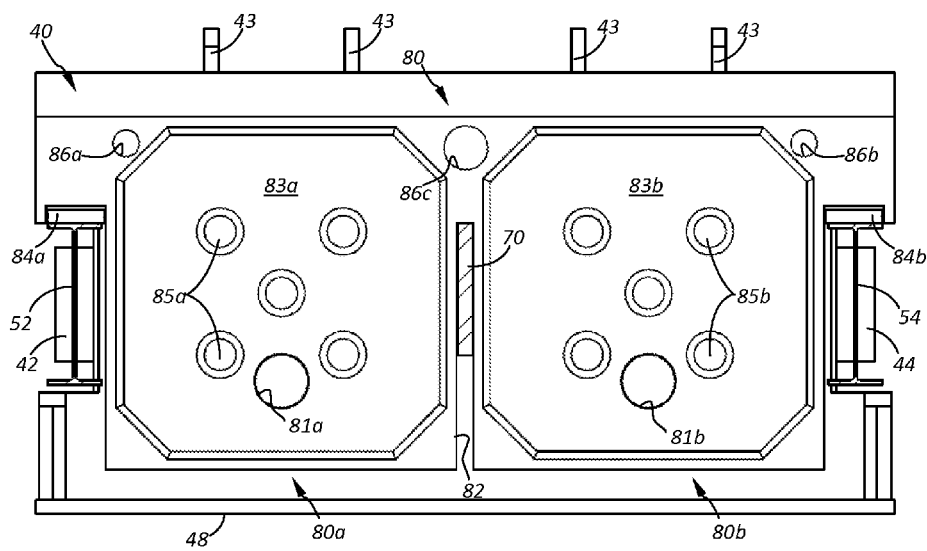
FIG. 5 is a transverse cross-sectional view of the horizontal filter press shown in FIGS. 1-3 as viewed from the section line shown in FIG. 3, showing a double filter plate.
Figure 6:
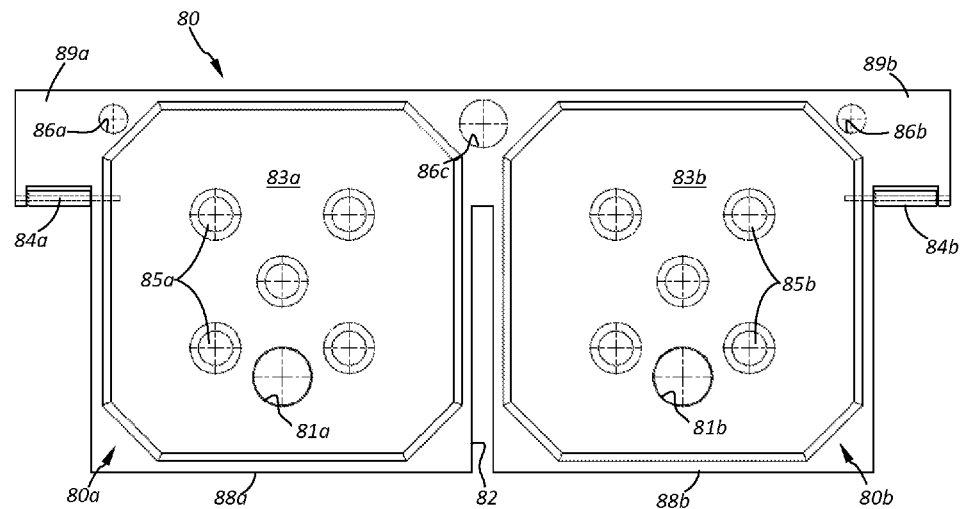
FIG. 6 depicts a front plan view of a double filter plate according to some embodiments.

FIGS. 1-6 show a horizontal filter press 10 according to a first embodiment. The filter press 10 includes a support bracket 20 having a base 28 and a plurality of stiffening webs 23 at a proximal end and a head bracket 40 having a base 48 and a plurality of stiffening webs 43 at a distal end. Brackets 20 and 40 are connected to each other via sidebars 52, 54 joined to the brackets 20, 40 at connection points 22, 24, 42, 44. A central support beam 70 is further provided to support double filter plates 80 and simultaneously act as a tension member during compression of said filter plates 80.

Each double filter plate 80 comprises two similarly sized and shaped individual filter plates 80a, 80b. In the particular embodiment shown in FIGS. 5 and 6, filter plate 80 comprises a cutout 82 which is sized to receive the support beam 70. Double filter plate further comprises lateral handles 89a, 89b having thereon, a plate support roller or slide 84a, 84b which reduces friction between the plate 80 and sidebars 52, 54 during operation. One or more filtrate ports 86a, 86b, 86c may be provided to allow egress of filtrate squeezed out between plates and filtered through a filter cloth (not shown). The filtrate ports 86a, 86b, 86c may alternatively be used for delivering compressed air for an optional air blow sequence, and may be compatible with multi-directional feed pipe systems without limitation. Support bracket 20 may comprise one or more filtrate pipe apertures to allow egress of filtrate through a proximal side of the filter press 10.

In operation, a moving crosshead 66 (which is represented with dashed lines and not shown for clarity) forces a follower plate 30 having a base 38 and lateral handles 32, 34 supported by sidebars 52, 54 against the double filter plates 80, thereby urging the plates 80 together. The crosshead 66 may be driven by long-stroke hydraulic ram cylinder, unidirectional multi pawl chain, or reciprocating type shifter in some embodiments, however, it is preferred that a hydraulically-actuated chain drive such as an FLSmidth® EIMCO® AFP IV Automated Filter Press chain drive be used to promote rapid cycle times, fast plate shifting, and quick cake discharge. Two laterally-extending short-stroke locking cylinders (not shown) are mounted in a rolling carriage provided on the crosshead 66, which spans the distance between sidebars 52, 54. With the crosshead 66 fully retracted, a uniform gap is opened between each plate 80, allowing all filter chambers 83a, 83b to empty and discharge a formed cake from the bottom 88a, 88b of each individual filter plate 80a, 80b. With the crosshead 66 fully contracted, the plates 80 return to a filtration position where sealing surfaces 87a, 87b are in close contact and locking cylinders anchor the carriage to the sidebars 52, 54 or other portion of the filter press 10. Additional closing pressure may be applied to the plate stack by actuating one or more closure cylinders 62, 64 provided on the crosshead 66 which is locked in place on the filter press 10. Accordingly, slurry feed is resumed. A number of feed eye ports 81a, 81b are provided to the double filter plates 80 to allow slurry to enter the filter chambers 83a, 83b between plates 80. One or more stay bosses 85a, 85b may be provided to distribute clamping loads and support a filter cloth (not shown) provided to each plate 80.

Figure 7:
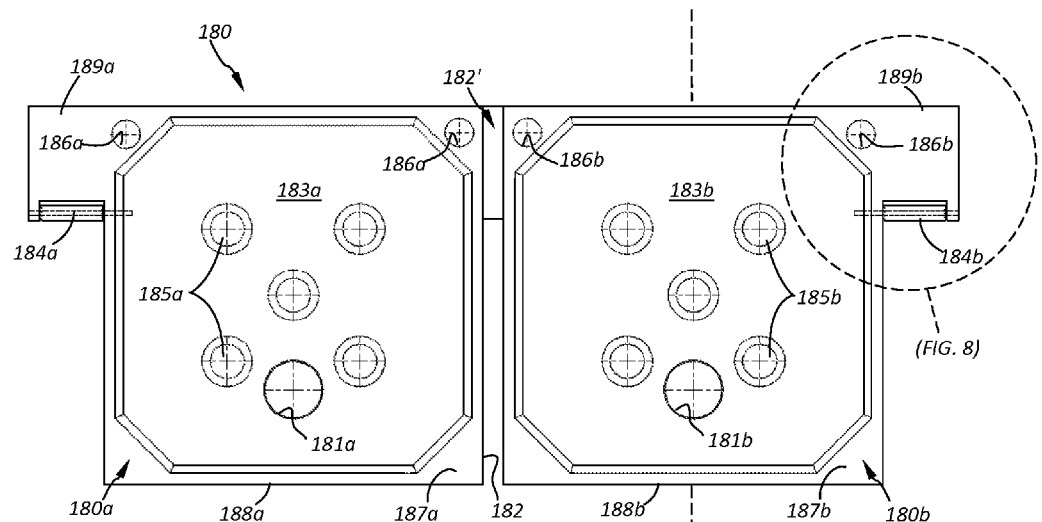
FIG. 7 depicts a front plan view of a double filter plate according to other embodiments.

FIG. 7 illustrates another embodiment of a double filter plate 180, wherein the plate 180 comprises two individual filter plates 180a, 180b. Feed eye ports 181a, 181b are provided for filling each of the four filter chambers 183a, 183b within the double filter plate 180 (it will be readily apparent to those of ordinary skill in the art, that the plate 180 shown is two-sided—only one side being shown). A cutout 182 extending from bottom portions 188a, 188b of the plate 180 is formed by placing a spacer bar 182' between the individual filter plates 180a, 180b adjacent upper regions of the plates 180a, 180b, and then joining the spacer bar 182' and individual filter plates 180a, 180b together via heat or friction bonding, welding, gluing, bolting, mechanical joining (e.g., dovetail), fasteners, connectors, other conventional means for joining, or combinations thereof. Individual filter plates 180a, 180b may be identical plates, wherein one of the plates (e.g., 180b) is flipped 180 degrees about a vertical axis 175 with respect to the other plate 180a. One or more plate support rollers or slides 184a, 184b may be provided to handles 189a, 189b extending from each individual filter plate 180a, 180b. As with the first embodiment plate 180, a plurality of stay bosses 185a, 185b, filtrate ports 186a, 186b (e.g., multi-directional filtrate ports), and sealing surfaces 187a, 187b may be advantageously provided.

Figure 8:
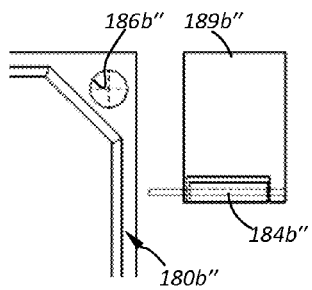
FIG. 8 shows that an integrally-formed handle on a filter plate may alternatively be provided as a separate modular piece.

FIG. 8 shows an alternative embodiment of the double filter plate 180 shown in FIG. 7, wherein a handle 189b" is a separate, non-homogenously integral part which is separately joined to a side portion of an individual filter plate 180b". A plate support roller/slide 184b" may be provided to the handle 189b", and one or more filtrate ports 186b" may be provided to the individual filter plate 180".

Figure 9:
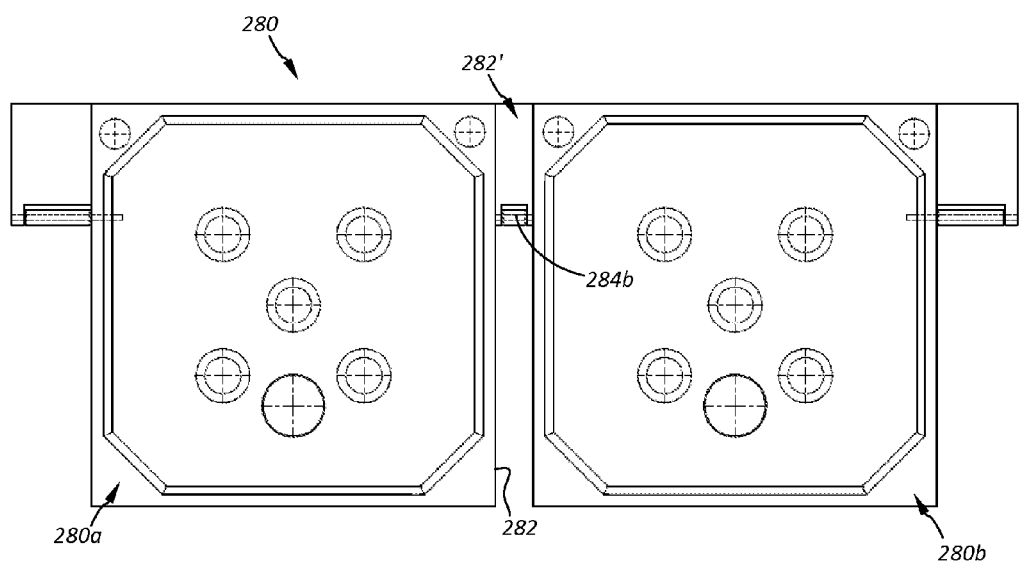
FIG. 9 shows an embodiment of a double filter plate, wherein a spacer bar forms a cutout sized for a support beam, and further comprises one or more rollers or slides for smooth contact with the support beam.

FIG. 9 shows an embodiment of a double filter plate 280 comprising a spacer bar 282' separating two individual filter plates 280a, 280b and forming a cutout 282, wherein the spacer bar 282' further comprises one or more plate support rollers or slides 284b to smoothen travel of the plate as the spacer bar 282' makes loaded contact with a support beam (not shown).

Figure 10:
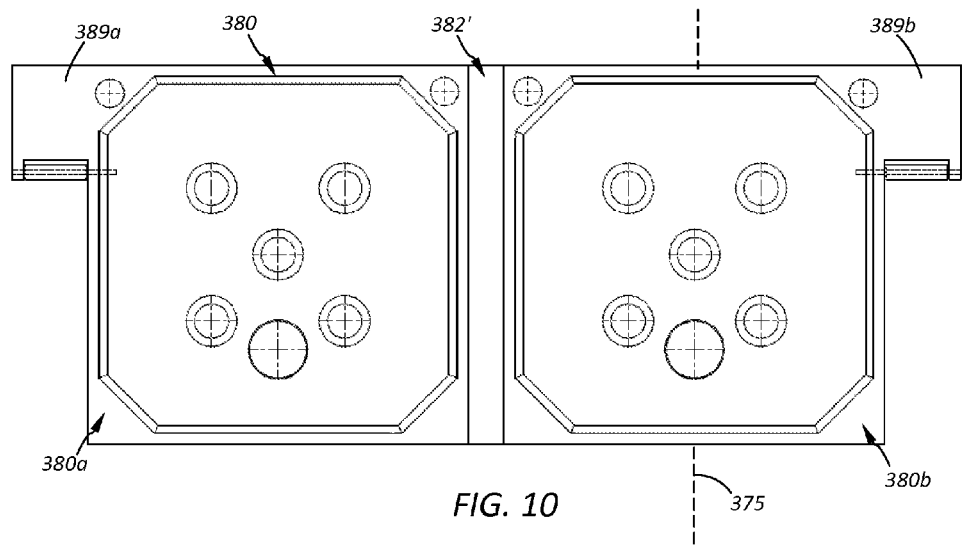
FIG. 10 shows an embodiment of a double filter plate comprising a spacer bar which spans entirely between two individual filter plates
Figure 17:
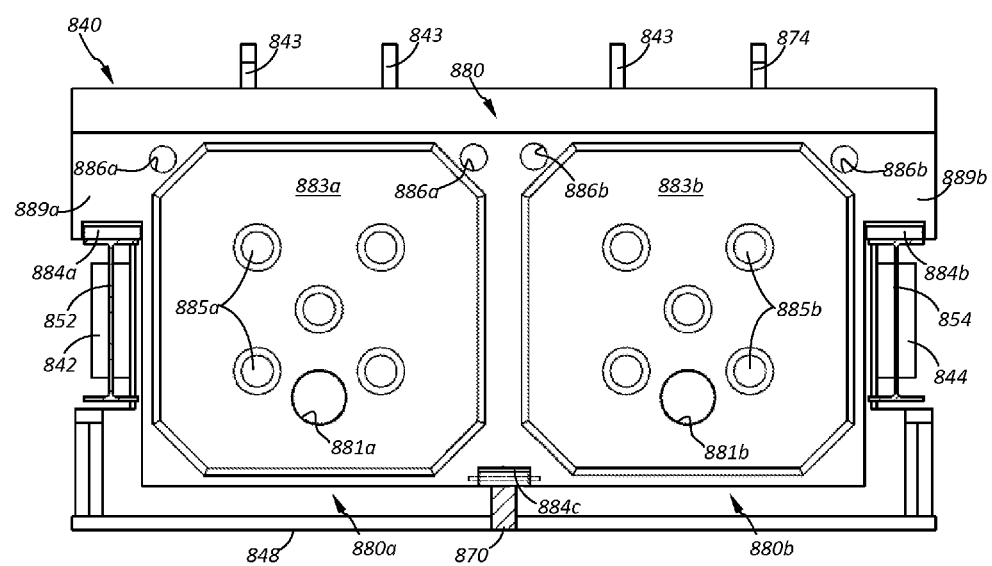

FIG. 10 shows an embodiment of a double filter plate 380 comprising a spacer bar 382' separating two individual filter plates 380a, 380b and running the entire height of each of the individual filter plates 380a, 380b so as to form no cutout(s) therebetween. The spacer bar 382' may reinforce the dual filter plate 380 assembly, and/or provide a small surface which can ride along a support beam below the plate 380 (e.g., similar to what is shown in FIG. 17). Plate 380 may further comprise integral or modular handles 389a, 389b which support the weight of the plate 380 on one or more sidebars (not shown). If handles 389a, 389b are integrally-formed and monolithic with the individual filter plates 380a and 380b, respectively, as shown in FIG. 10, then the double filter plate 380 may be formed by rotating one of the individual filter plates (e.g., 380b) 180 degrees around a vertical axis 375 with respect to the other individual filter plate 380a.

Figure 11:
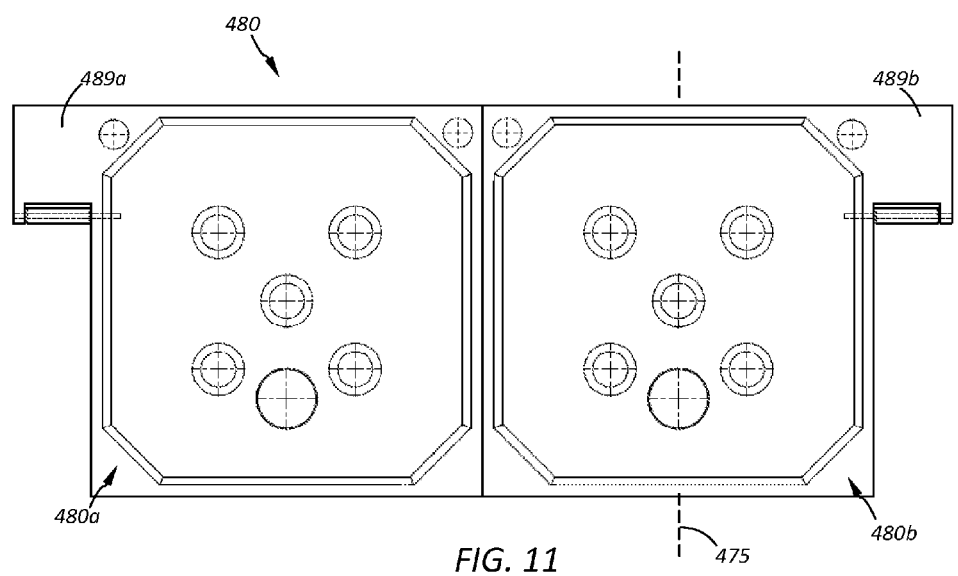
FIG. 11 shows an embodiment of a double filter plate wherein no spacer bar is provided and individual filter plates are adjacently joined.

FIG. 11 shows an embodiment of a double filter plate 480 comprising no spacer bar, wherein two individual filter plates 480a, 480b are joined directly together along the entire height of each of the individual filter plates 480a, 480b so as to form no cutout(s) therebetween. The double filter plate 480 may further comprise integral or modular handles 489a, 489b which are designed to support the weight of the plate 480 on one or more sidebars (not shown). As shown in FIG. 11, if handles 489a, 489b are integrally-formed and monolithic with the individual filter plates 480a and 480b, respectively, then the double filter plate 480 is formed by rotating one of the individual filter plates (e.g., 480b) 180 degrees around a vertical axis 475 with respect to the other individual filter plate 480a.

Figure 12:
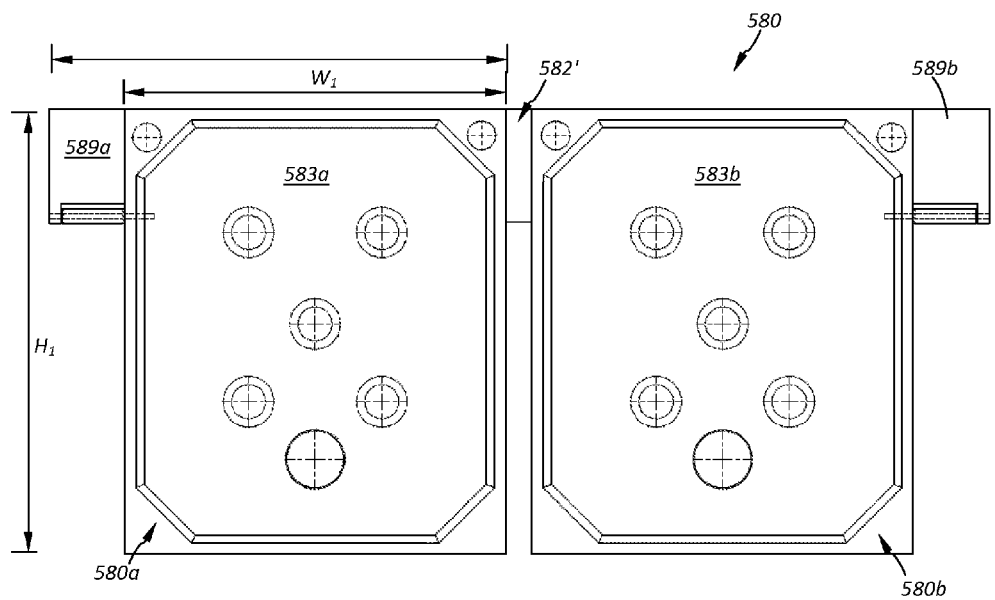
FIGS. 12 and 13 schematically illustrates embodiments of a double filter plate wherein a width of each individual filter plate may be smaller or larger than a height of each individual filter plate, respectively.
Figure 13:
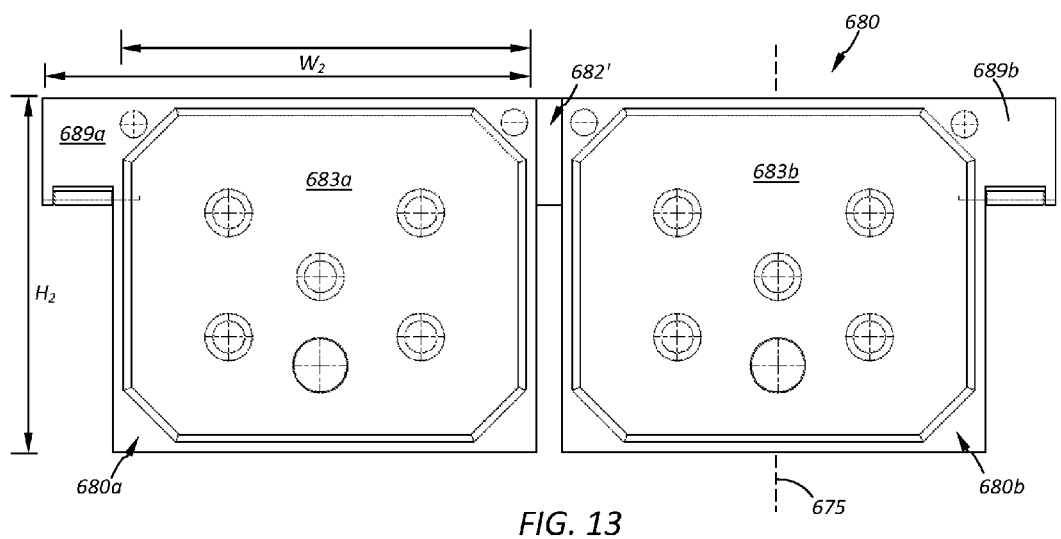

According to FIGS. 12 and 13, a double filter plate 580 may comprise one or more oblong filter chambers 583a, 583b, 683a, 683b. As seen in FIG. 12, two individual filter plates 580a, 580b may be separated by a spacer bar 582', wherein the individual filter plates 580a, 580b each have a height $H_1$ that is greater than a width $W_1$. Conversely, as seen in FIG. 13, two individual filter plates 680a, 680b may be separated by a spacer bar 682', wherein the individual filter plates 680a, 580b each have a height $H_2$ that is less than a width W$_2$. Widths W$_1$, W$_2$ may include a distance covering the area of the filter chamber 583a, 583b, 683a, 683b alone or in combination with the distance covering the width of handles 589a, 589b, 689a, 689b as shown.

As shown in FIG. 13, handles 689a, 689b may be integrally-formed and monolithic with the individual filter plates 680a and 680b, respectively. In such cases, the double filter plate 680 is formed by rotating one of the individual filter plates (e.g., 680b) 180 degrees around a vertical axis 675 with respect to the other individual filter plate 680a.

Figure 14:
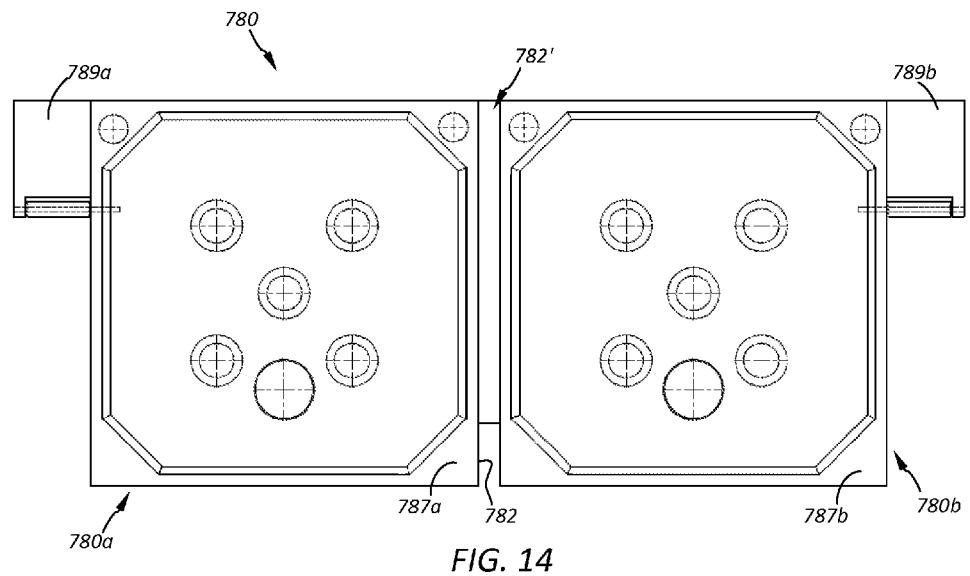
FIGS. 14 and 15 show an embodiment of a double filter plate and horizontal filter press wherein a support beam is provided to a shallow cutout in a central bottom portion of the plate, in addition to lateral sidebars.
Figure 15:
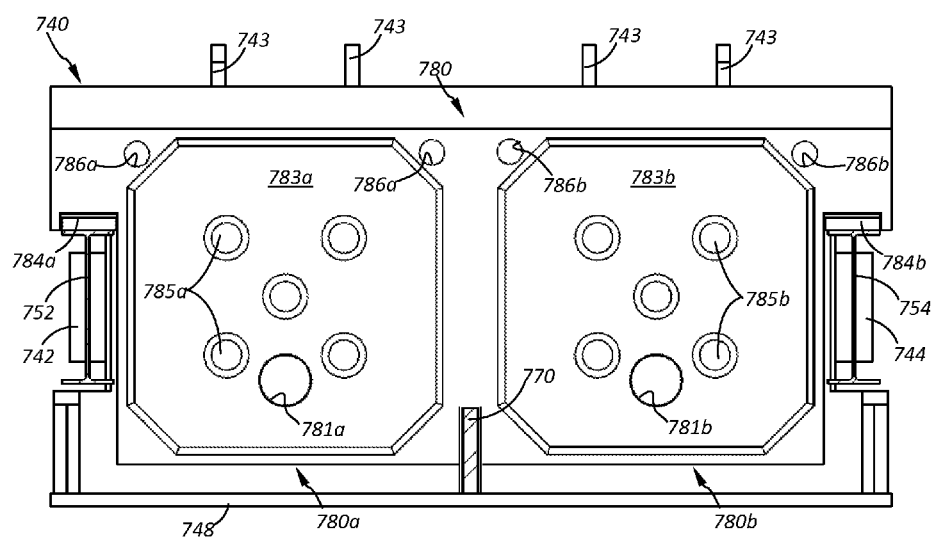

FIGS. 14 and 15 show an embodiment of a double filter plate 780, wherein a support beam 770 is provided to a shallow cutout 782 in a central bottom portion of the double filter plate 780, between two individual filter plates 780a, 780b. The cutout 782 is formed by an elongated spacer bar 782' which extends between most, but not all of the height of the individual filter plates 780a, 780b. Handles 789a, 789b support the double filter plate 780 at upper lateral portions of the double filter plate 780, whereas the spacer bar 782' supports central portions of the plate 780 on the support beam 770 at a location relatively lower than the sidebars 752, 754.

FIG. 15 shows the double filter plate 780 installed in a horizontal filter press proximate a head bracket 740 having one or more stiffening webs 743, wherein the plate 780 comprises feed eye ports 781a, 781b provided for filling each of the four filter chambers 783a, 783b within the double filter plate 780 (it will be readily apparent to those of ordinary skill in the art, that the plate 780 shown is two-sided—only one side and two filter chambers 783a, 783b being shown). The spacer bar 782', individual filter plates 780a, 780b, and handles 789a, 789b may be integrally joined together via heat or friction bonding, welding, gluing, bolting, mechanical joining (e.g., dovetail), fasteners, connectors, other conventional means for joining, or combinations thereof. Individual filter plates 780a, 780b may be identical plates. One or more plate support rollers or slides 784a, 784b may be provided to the handles 789a, 789b, and a plurality of stay bosses 785a, 785b, filtrate ports 786a, 786b (e.g., multi-directional filtrate ports), and sealing surfaces 787a, 787b may be advantageously provided.

Figure 16:
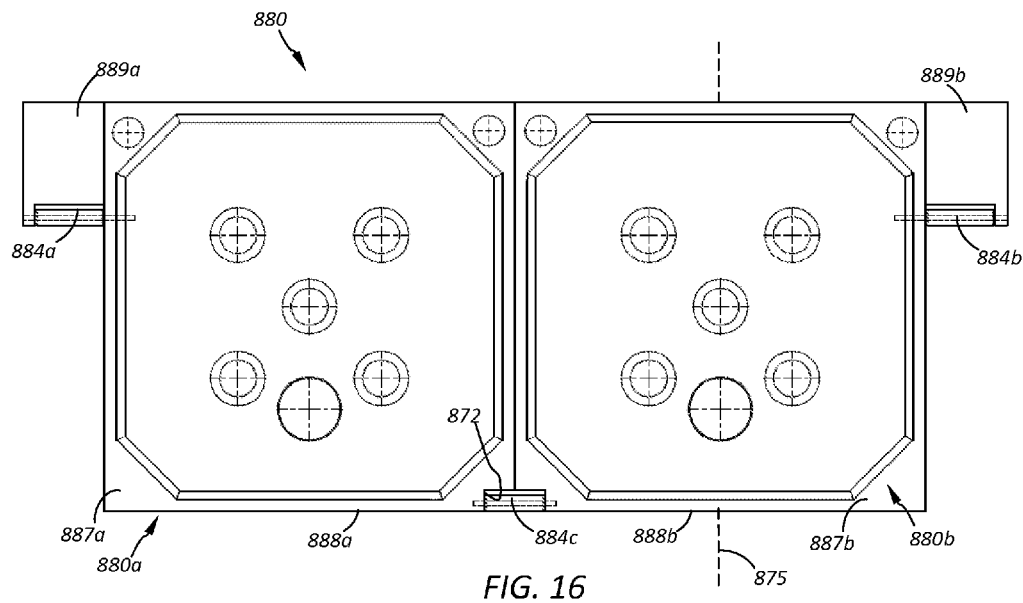
FIGS. 16 and 17 show another embodiment of a double filter plate and horizontal filter press wherein a support beam is provided underneath the filter plate under a central bottom portion of the plate, in addition to lateral sidebars.

FIGS. 16 and 17 show another embodiment of a double filter plate 880, wherein a support beam 870 is provided below a lower central bottom portion 888a, 888b of the double filter plate 880, between two individual filter plates 880a, 880b. The two individual filter plates 880a, 880b are directly connected to each other along essentially the entire height of the individual filter plates 880a, 880b without the use of a spacer bar 882'. Handles 889a, 889b support the double filter plate 880 at upper lateral portions of the double filter plate 880, whereas the support beam 870 supports lower central bottom portions 888a, 888b of the plate 880 at a location relatively lower than the sidebars 852, 854.

FIG. 17 shows the double filter plate 880 installed in a horizontal filter press proximate a head bracket 840 having one or more stiffening webs 843, wherein the plate 880 comprises feed eye ports 881a, 881b provided for filling each of the four filter chambers 883a, 883b within the double filter plate 880 (it will be readily apparent to those of ordinary skill in the art, that the plate 880 shown is two-sided—only one side and two filter chambers 883a, 883b being shown). The individual filter plates 880a, 880b, and handles 889a, 889b may be integrally joined together via heat or friction bonding, welding, gluing, bolting, mechanical joining (e.g., dovetail), fasteners, connectors, other conventional means for joining, or combinations thereof. Individual filter plates 880a, 880b may be identical plates each comprising a plate support roller/slide accommodation feature 872 such as a recess, pocket, or protruding mounting boss (not shown) in order to accommodate a central roller or slide 884c, wherein one of the plates (e.g., 880b) is flipped 180 degrees about a vertical axis 875 with respect to the other plate 880a. Alternatively, neither of the individual filter plates 880a, 880b would need to be flipped if the recesses or mounting bosses are provided symmetrically to both lower sides of each individual filter plate 880a, 880b (this is not shown). One or more plate support rollers or slides 884a, 884b may additionally be provided to the handles 889a, 889b, and a plurality of stay bosses 885a, 885b, filtrate ports 886a, 886b (e.g., multi-directional filtrate ports), and sealing surfaces 887a, 887b may be advantageously provided.

Figure 18:
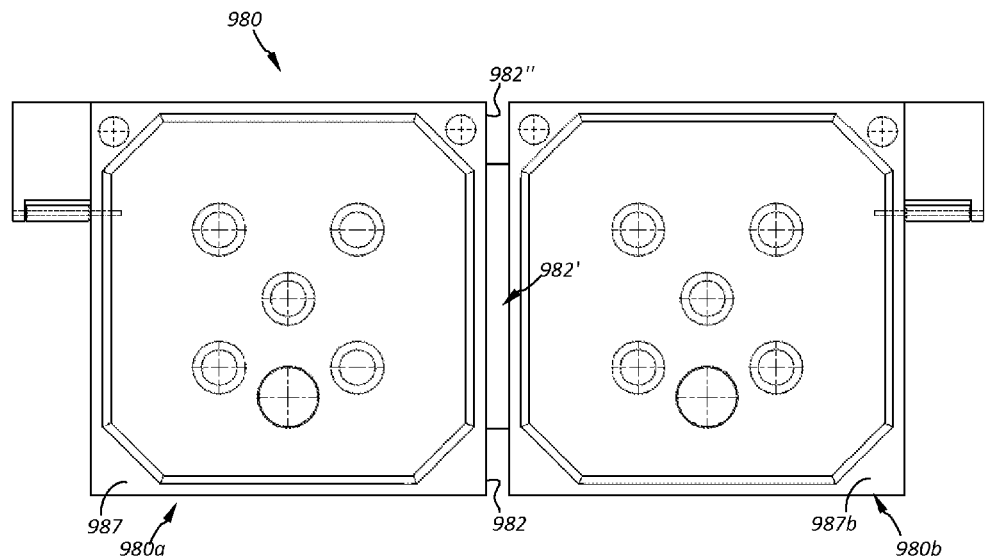
FIGS. 18 and 19 show yet another embodiment of a double filter plate and horizontal filter press wherein upper and lower support beams are provided above and underneath the filter plate in a central location of the plate, in addition to lateral sidebars.
Figure 19:
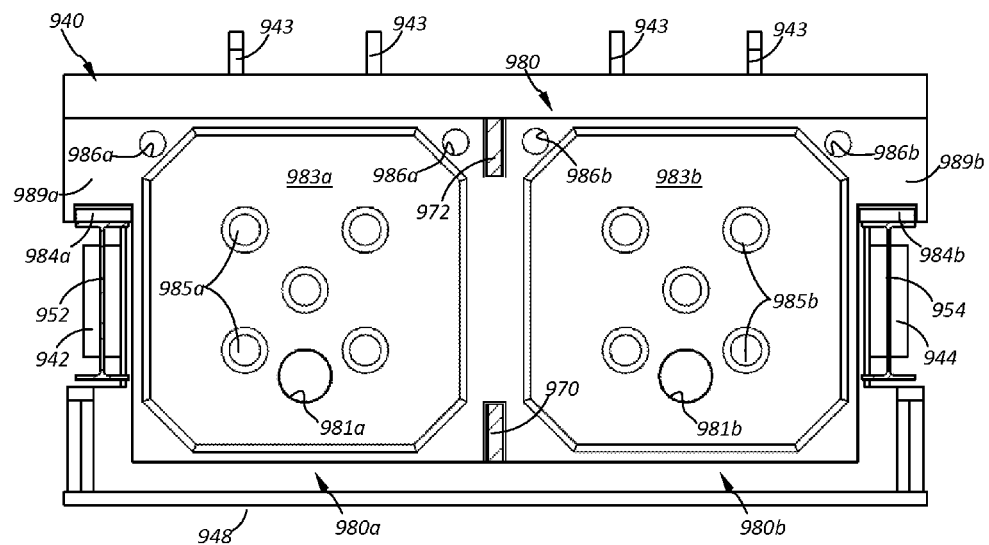

FIGS. 18 and 19 show yet even another embodiment of a double filter plate 980, wherein an upper support beam 972 and lower support beam 970 is provided to a central portion of the double filter plate 980, between two individual filter plates 980a, 980b and respectively above and below a spacer bar 982'. The two individual filter plates 980a, 980b are connected to each other via said spacer bar 982' along only middle regions extending between the individual filter plates 980a, 980b. Handles 989a, 989b support the double filter plate 980 at upper lateral portions of the double filter plate 980, whereas the lower and upper support beams 970, 972 support upper and lower central portions of the plate 980, respectively at locations substantially non-coplanar with, or at different heights in relation to the sidebars 952, 954. By having four total elongated members capable of loading (i.e., support beams 970, 972 and sidebars 952, 954), plate alignment is improved and compression forces between plates along sealing surfaces 988a, 988b are more equally distributed.

FIG. 19 shows the double filter plate 980 installed in a horizontal filter press proximate a head bracket 940 having one or more stiffening webs 943, wherein the plate 980 comprises feed eye ports 981a, 981b provided for filling each of the four filter chambers 983a, 983b within the double filter plate 980 (it will be readily apparent to those of ordinary skill in the art, that the plate 980 shown is two-sided, wherein only one side and two filter chambers 983a, 983b are visible). The individual filter plates 980a, 980b, and handles 989a, 989b may be integrally joined together via heat or friction bonding, welding, gluing, bolting, mechanical joining (e.g., dovetail), fasteners, connectors, other conventional means for joining, or combinations thereof. One or more plate support rollers or slides 984a, 984b may be provided to the handles 989a, 989b, and a plurality of stay bosses 985a, 985b, filtrate ports 986a, 986b (e.g., multi-directional filtrate ports), and sealing surfaces 987a, 987b may be advantageously provided. Optionally, while not shown, one or more plate support rollers or slides 984a, 984b may be provided to upper and/or lower portions of spacer bar 982'.

Figure 20:
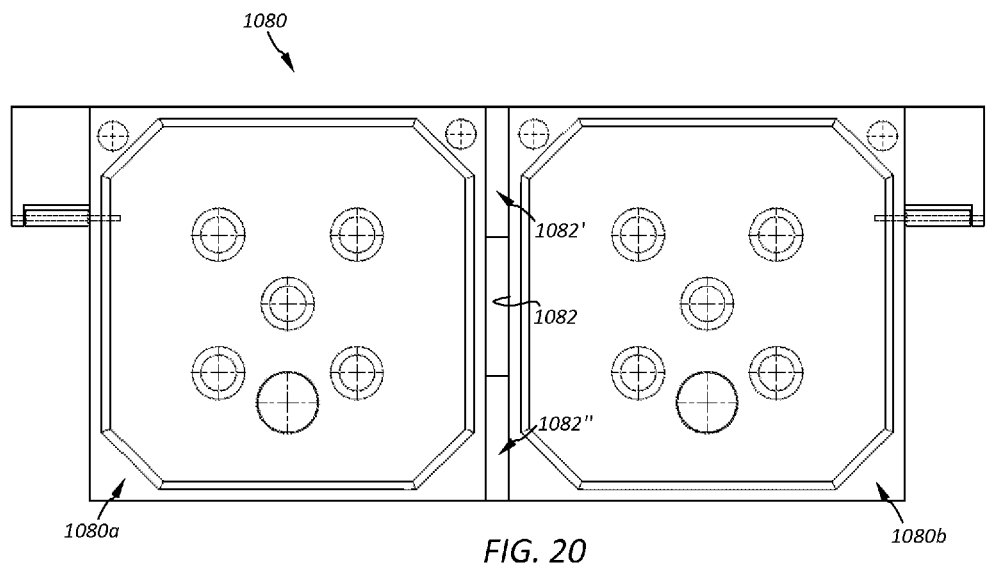
Figure 21:
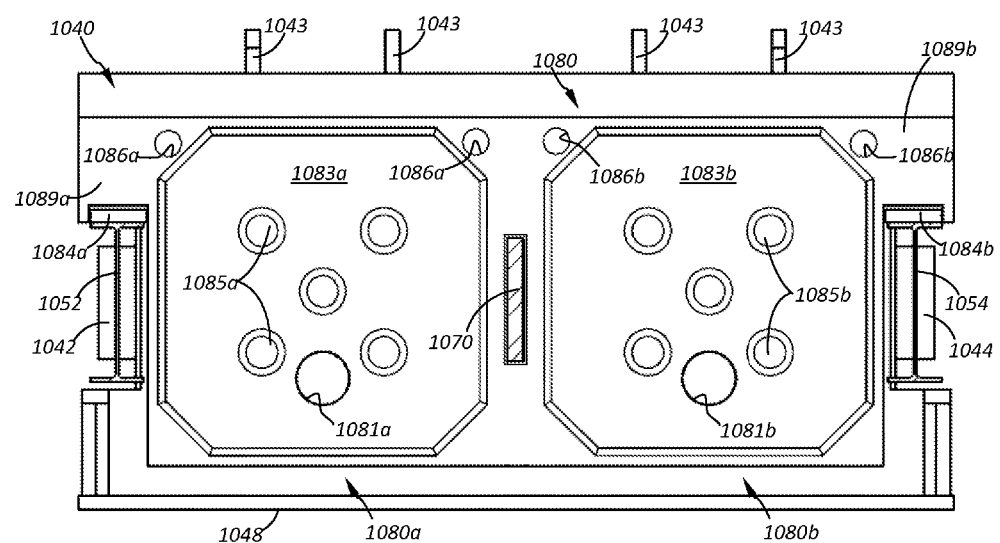

FIGS. 20 and 21 show yet even another embodiment of a double filter plate 1080, wherein a support beam 1070 is provided to and captured within a central portion of the double filter plate 1080, between two individual filter plates 1080a, 1080b and an upper 1082' and lower 1082" spacer bars. The two individual filter plates 1080a, 1080b are connected to each other via said upper and lower spacer bars 1082', 1082" along only upper and lower portions extending between the individual filter plates 1080a, 1080b. Handles 1089a, 1089b support the double filter plate 1080 at upper lateral portions of the double filter plate 1080, whereas the support beam 1070 supports central portions of the plate 1080 at a location substantially coplanar with, approximately in line with, or at a location at a similar height in relation to the sidebars 1052, 1054.

FIG. 21 shows the double filter plate 1080 installed in a horizontal filter press proximate a head bracket 1040 having one or more stiffening webs 1043, wherein the plate 1080 comprises feed eye ports 1081a, 1081b provided for filling each of the four filter chambers 1083a, 1083b within the double filter plate 1080 (it will be readily apparent to those of ordinary skill in the art, that the plate 1080 shown is two-sided—only one side and two filter chambers 1083a, 1083b being shown). The individual filter plates 1080a, 1080b, and handles 1089a, 1089b may be integrally joined together via heat or friction bonding, welding, gluing, bolting, mechanical joining (e.g., dovetail), fasteners, connectors, other conventional means for joining, or combinations thereof. One or more plate support rollers or slides 1084a, 1084b may be provided to the handles 1089a, 1089b, and a plurality of stay bosses 1085a, 1085b, filtrate ports 1086a, 1086b (e.g., multi-directional filtrate ports), and sealing surfaces 1087a, 1087b may be advantageously provided. Optionally, while not shown, one or more plate support rollers or slides 1084a, 1084b may be provided to the bottom of the upper spacer bar 1082', or upper portions of the lower spacer bar 1082".

Figure 22:
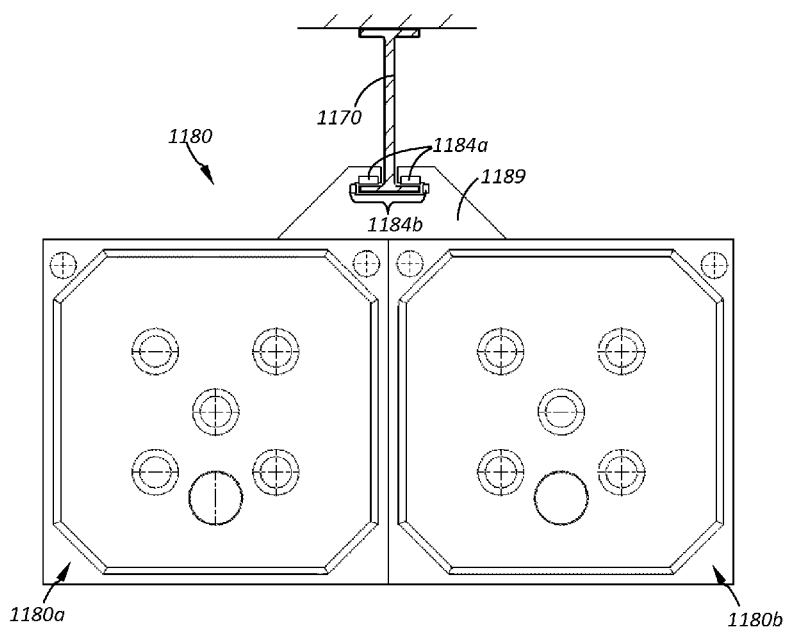
FIGS. 22-25 illustrate various embodiments of a double filter plate configured to be suspended by one or more support beams.

FIGS. 22-25 illustrate various embodiments of double filter plates which are configured to be suspended by support beams in an overhead beam configuration. FIG. 22 shows one example of a double filter plate 1180 configured to be suspended by a single central support beam 1170 in an overhead beam configuration. In the specific embodiment shown, two identical individual filter plates 1180a, 1180b are joined directly together in a side-by-side relationship. The individual filter plates 1180a, 1180b may be integrally joined together joined together via heat or friction bonding, welding, gluing, bolting, mechanical joining (e.g., dovetail), fasteners, connectors, other conventional means for joining, or combinations thereof. A handle 1189 may subsequently be separately joined to the combined individual filter plates 1180a, 1180b. Alternatively, while not shown, each individual filter plate 1180a, 1180b may comprise an integrally-formed and monolithic half of handle 1189, wherein the handle 1189 becomes whole after the two individual filter plates 1180a, 1180b are joined. One or more upper 1184a and lower 1184b plate support rollers or slides may be provided to the handle 1189. While not shown, a spacer bar may be placed between and joined with the individual filter plates 1180a, 1180b, and in such embodiments, handle 1189 may be integrally-formed and monolithic with said spacer bar (not shown).

Figure 23:
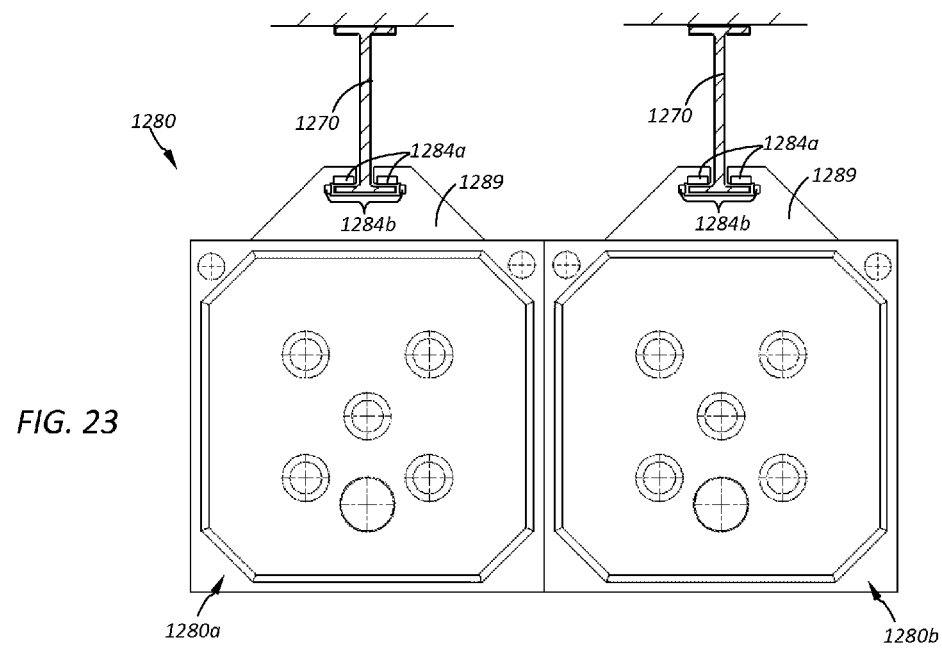

FIG. 23 shows yet another example of a suspended double filter plate 1280. In the shown embodiment, the double filter plate 1280 is configured to be suspended by two support beams 1270 in an overhead beam configuration. In the specific embodiment shown, two identical individual filter plates 1280a, 1280b are joined directly together in a side-by-side relationship. The individual filter plates 1280a, 1280b may be integrally joined together joined together via heat or friction bonding, welding, gluing, bolting, mechanical joining (e.g., dovetail), fasteners, connectors, other conventional means for joining, or combinations thereof. A handle 1289 may subsequently be separately joined to an upper portion of each of the individual filter plates 1280a, 1280b. Alternatively, while not shown, each individual filter plate 1280a, 1280b may comprise an integrally-formed and monolithic handle 1289. One or more sets of upper 1284a and lower 1284b plate support rollers or slides may be provided to the handles 1289. While not shown, a spacer bar may be placed between and joined with the individual filter plates 1280a, 1280b.

Figure 24:
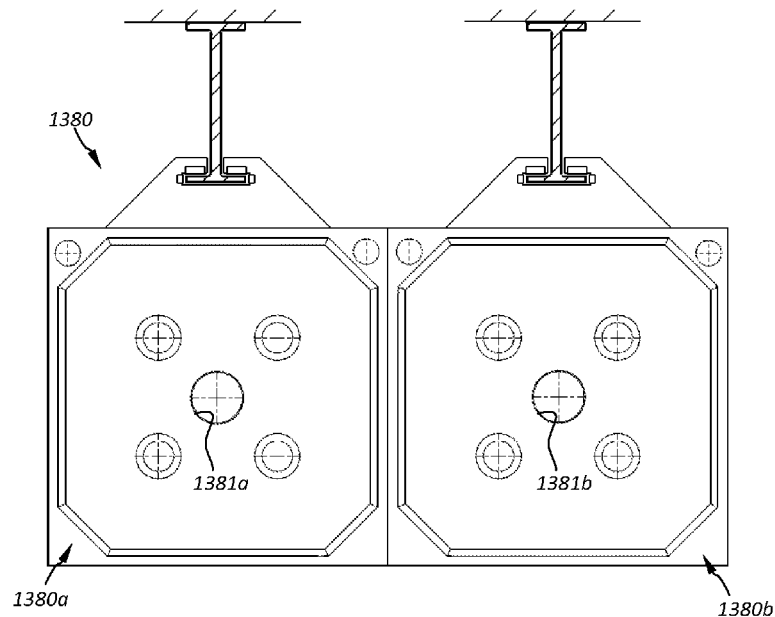

FIG. 24 shows yet even another example of a double filter plate 1380 formed by joining two identical individual filter plates 1380a, 1380b together in a side-by-side relationship. The double filter plate shown 1380 comprises feed eye ports 1381a, 1381b which are more centrally located with respect to each of the individual filter plates 1380a, 1380b.

Figure 25:
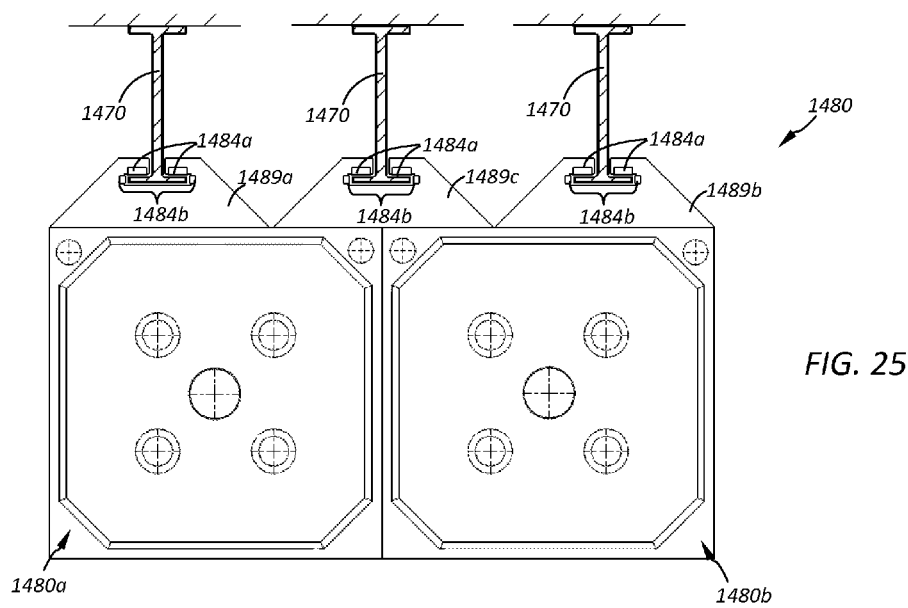

FIG. 25 shows yet another example of a suspended double filter plate 1480. In the shown embodiment, the double filter plate 1480 is configured to be suspended by three or more support beams 1470 in an overhead beam configuration. In the specific embodiment shown, two identical individual filter plates 1480a, 1480b are joined directly together in a side-by-side relationship. The individual filter plates 1480a, 1480b may be integrally joined together joined together via heat or friction bonding, welding, gluing, bolting, mechanical joining (e.g., dovetail), fasteners, connectors, other conventional means for joining, or combinations thereof. In some embodiments (not shown), a single handle may connect the double filter plate 1480 to the three or more support beams 1470. Alternatively, as in the shown embodiment, a multiplicity of handles 1489a, 1489b, 1489c may connect the double filter plate 1480 to the three or more support beams 1470. One or more of the handles 1489a, 1489b, 1489c may be modular and separately joined with the individual filter plates 1480a, 1480b, or may be integrally-formed and monolithic with the individual filter plates 1480a, 1480b. One or more sets of upper 1484a and lower 1484b plate support rollers or slides may be provided to each handle 1489a, 1489b, 1489c. While not shown, a spacer bar may be placed between and joined with the individual filter plates 1480a, 1480b, and in such embodiments, one or more handles 1489a, 1489b, 1489c may be integrally-formed and monolithic with said spacer bar (not shown).

Figure 26:
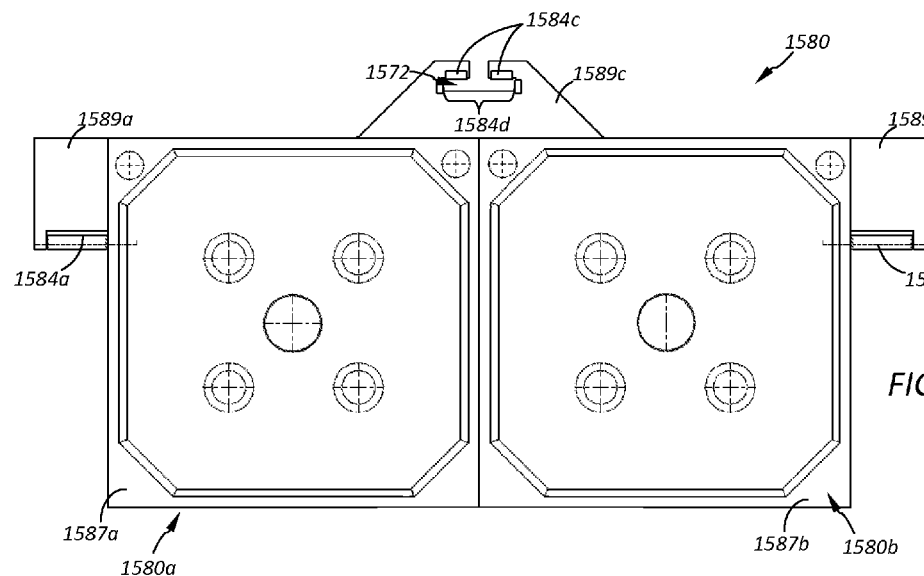
FIGS. 26 and 27 show yet another embodiment of a double filter plate and horizontal filter press wherein a central handle is configured to suspend the plate from an upper central support beam, in addition to lateral handles which are configured to support the plate on lateral sidebars.
Figure 27:
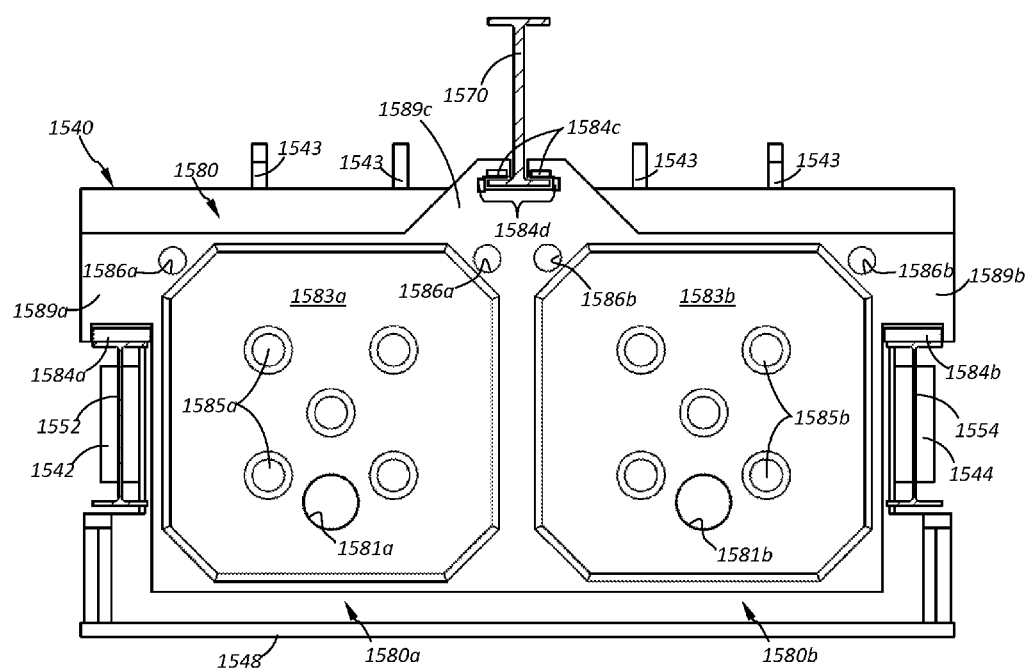
Figure 28:
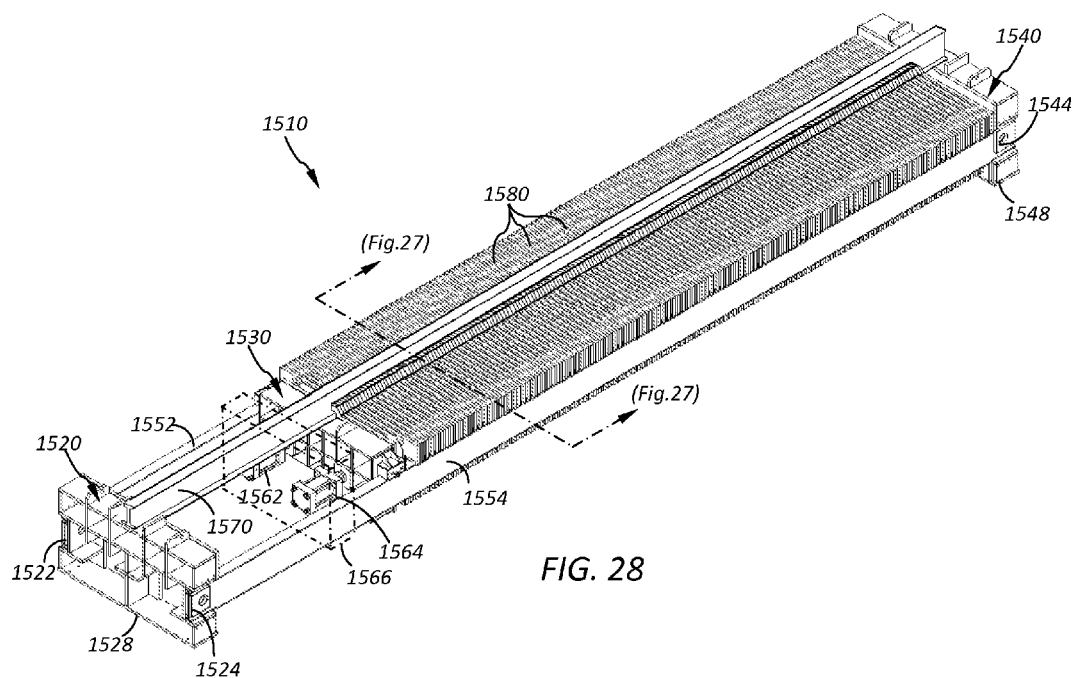
FIG. 28 is an isometric view of the horizontal filter press shown in FIGS. 26 and 27.

In some embodiments, such as the one shown in FIGS. 26-28, double filter plates 1580 may be both supported by sidebars 1552, 1554 and suspended by an overhead support beam 1570. In the event maintenance on one or more of the double filter plates 1580 is necessary, the overhead support beam 1570 may be raised by a hydraulic ram, crane, or other heavy lifting device to elevate the plates 1580 enough to clear sidebars 1552, 1554 and allow transverse removal from the horizontal filter press 1510. The horizontal filter press 1510 shown in FIG. 28 includes a support bracket 1520 having a base 1528 at a proximal end and a head bracket 1540 having a base 1548 and a plurality of stiffening webs 1543 at a distal end. Brackets 20 and 40 are connected to each other via sidebars 1552, 1554 joined to the brackets 20, 40 at connection points 1522, 1524, 1542, 1544. A central overhead support beam 1570 is further provided to support double filter plates 1580 and simultaneously act as a tensioning member during compression of said filter plates 1580.

Each double filter plate 1580 comprises two similarly sized and shaped individual filter plates 1580a, 1580b. In the particular embodiment shown in FIGS. 26 and 27, double filter plate 1580 comprises an upper central handle 1589c having a receiving portion 1572 which is sized to receive the support beam 1570. Handle 1589c further comprises a set of upper 1584c and lower 1584d plate support rollers or slides which reduce friction between the plate handle 1589c and the support beam 1570 during operation. The double filter plate 1580 further comprises lateral handles 1589a, 1589b having thereon, one or more plate support rollers or slides 1584a, 1584b which reduce friction between the plate 1580 and sidebars 1552, 1554 during operation. One or more filtrate ports 1586*a*, 1586*b* or sets of filtrate ports may be provided to allow egress of filtrate squeezed out between the plates 1580 and filtered through a filter cloth (not shown). The filtrate ports 1586*a*, 1586*b* may alternatively be used for delivering compressed air for an optional air blow sequence, and may be compatible with multi-directional feed pipe systems, without limitation. Support bracket 1520 may comprise one or more filtrate pipe apertures to allow egress of filtrate through a proximal side of the filter press 1510.

In operation, a moving crosshead 1566 (which is represented with dashed lines and not shown for clarity) forces a follower plate 1530 having a base 1538 and lateral handles 1532, 1534 supported by sidebars 1552, 1554 against the double filter plates 1580, thereby urging the plates 1580 together. The crosshead 1566 may be driven by long-stroke hydraulic ram cylinder in some embodiments, however, it is preferred that a hydraulically-actuated chain drive such as an FLSmidth® EIMCO® AFP IV Automated Filter Press chain drive be used to promote rapid cycle times, fast plate shifting, and quick cake discharge. Two laterally-extending short-stroke locking cylinders (not shown) are mounted in a rolling carriage provided on the crosshead 1566, which spans the distance between sidebars 1552, 1554. With the crosshead 1566 fully retracted, a uniform gap is opened between each plate 1580, allowing all filter chambers 1583*a*, 1583*b* to empty and discharge a formed cake from the filter chamber 1583*a*, 1583*b* of each individual filter plate 1580*a*, 1580*b*. With the crosshead 1566 fully contracted, the plates 1580 return to a filtration position where sealing surfaces 1587*a*, 1587*b* are in close contact and locking cylinders (not shown) anchor the carriage to the sidebars 1552, 1554 or other portion of the filter press 1510. Additional closing pressure may be applied to the plate stack by actuating one or more closure cylinders 1562, 1564 provided on the crosshead 1566 which is locked in place on the filter press 1510. Accordingly, slurry feed is resumed. A number of feed eye ports 1581*a*, 1581*b* are provided to the double filter plates 1580 to allow slurry to enter the filter chambers 1583*a*, 1583*b* between the plates 1580. One or more stay bosses 1585*a*, 1585*b* may be provided to distribute clamping loads and support a filter cloth (not shown) provided on each opposing side of each plate double filter plate 1580.

Figure 29:
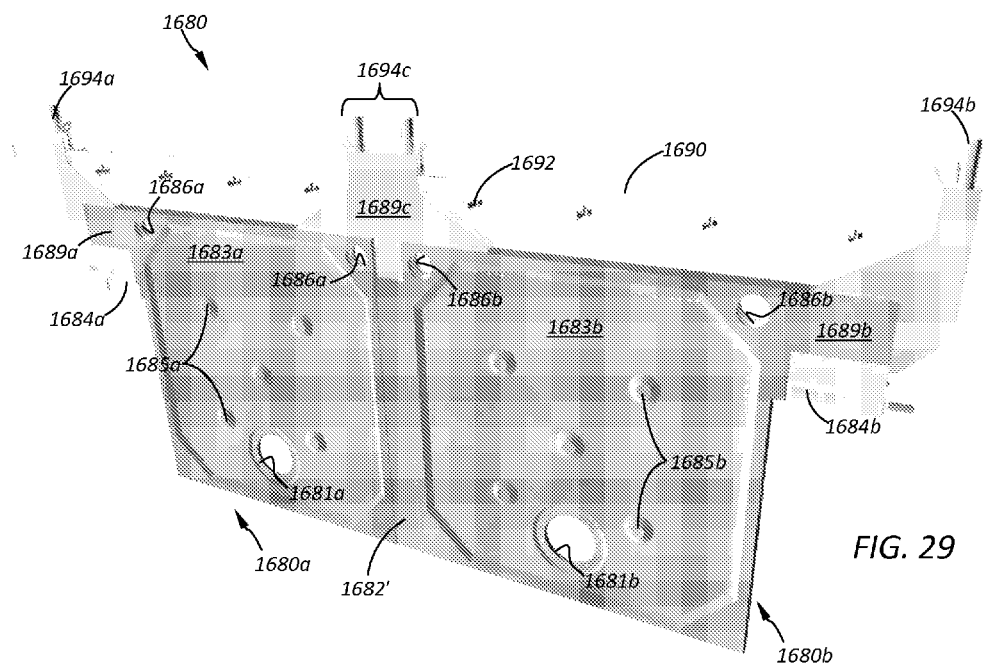
FIG. 29 shows yet another embodiment of a double filter plate comprising a spray bar, spray nozzles, and hoist point connections.
Figure 30:
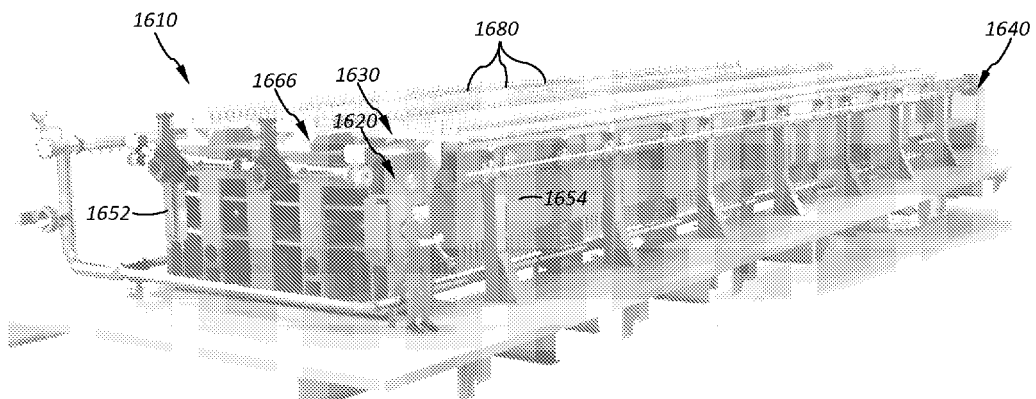
FIG. 30 is an isometric view of a horizontal filter press comprising a series of double filter plates of the type shown in FIG. 29.

FIGS. 29 and 30 show yet another embodiment of a double filter plate 1680, wherein no central support beam is utilized. Two individual filter plates 1680*a*, 1680*b* and a spacer bar 1682' sandwiched therebetween form the double filter plate 1680 when mechanically joined together. Mechanical joining may be done via heat or friction bonding, welding, gluing, bolting, mechanical joining (e.g., dovetail), fasteners, connectors, other conventional means for joining, or combinations thereof. Handles 1689*a*, 1689*b* support the double filter plate 1680 at upper lateral portions of the double filter plate 1680 on sidebars 1652, 1654 and may comprise one or more sets of friction-reducing plate support rollers or slides 1684*a*, 1684*b*.

Each double filter plate 1680 in the filter press 1610 may comprise one or more filtrate ports 1686*a*, 1686*b* or sets of filtrate ports, which allow egress of filtrate squeezed out between the plates 1680 and filtered through a filter cloth (not shown). The filtrate ports 1686*a*, 1686*b* may alternatively be used for delivering compressed air for an optional air blow sequence, and may be compatible with multi-directional feed pipe systems, without limitation. Support bracket 1620 may comprise one or more filtrate pipe apertures to allow egress of filtrate through a proximal side of the filter press 1610. In the particular embodiment shown, double filter plate may comprise one or more lateral hoist point connectors 1694*a*, 1694*b* provided proximate to the handles 1689*a*, 1689*b*, and optionally one or more host point connectors 1694*a*, 1694*b* provided proximate to an upper central portion of the double filter plate 1680, for example supported on a central handle 1689*c*. A number of feed eye ports 1681*a*, 1681*b* are provided to the double filter plates 1680 to allow slurry to enter the filter chambers 1683*a*, 1683*b* between double filter plates 1680 and form a filter cake as filtrate passes through a filter cloth (not shown) and exits the filter chambers 1683*a*, 1683*b* via filtrate ports 1686*a*, 1686*b*. A spray bar 1690 having a plurality of spray nozzles 1692 may extend across an upper portion of the double filter plate 1680 to wash the filter cloth after cake discharge. One or more stay bosses 1685*a*, 1685*b* may be provided to distribute clamping loads and support a filter cloth (not shown) provided to each plate 1680.

In operation, a moving crosshead 1666 forces a follower plate 1630 (which is supported by sidebars 1652, 1654) against the series of double filter plates 1680, thereby urging the double filter plates 1680 together. The crosshead 1666 may be driven by long-stroke hydraulic ram cylinder in some embodiments, however, it is preferred that a hydraulically-actuated chain drive such as an FLSmidth® EIMCO® AFP IV Automated Filter Press chain drive be used to promote rapid cycle times, fast plate shifting, and quick cake discharge.

Figure 31:
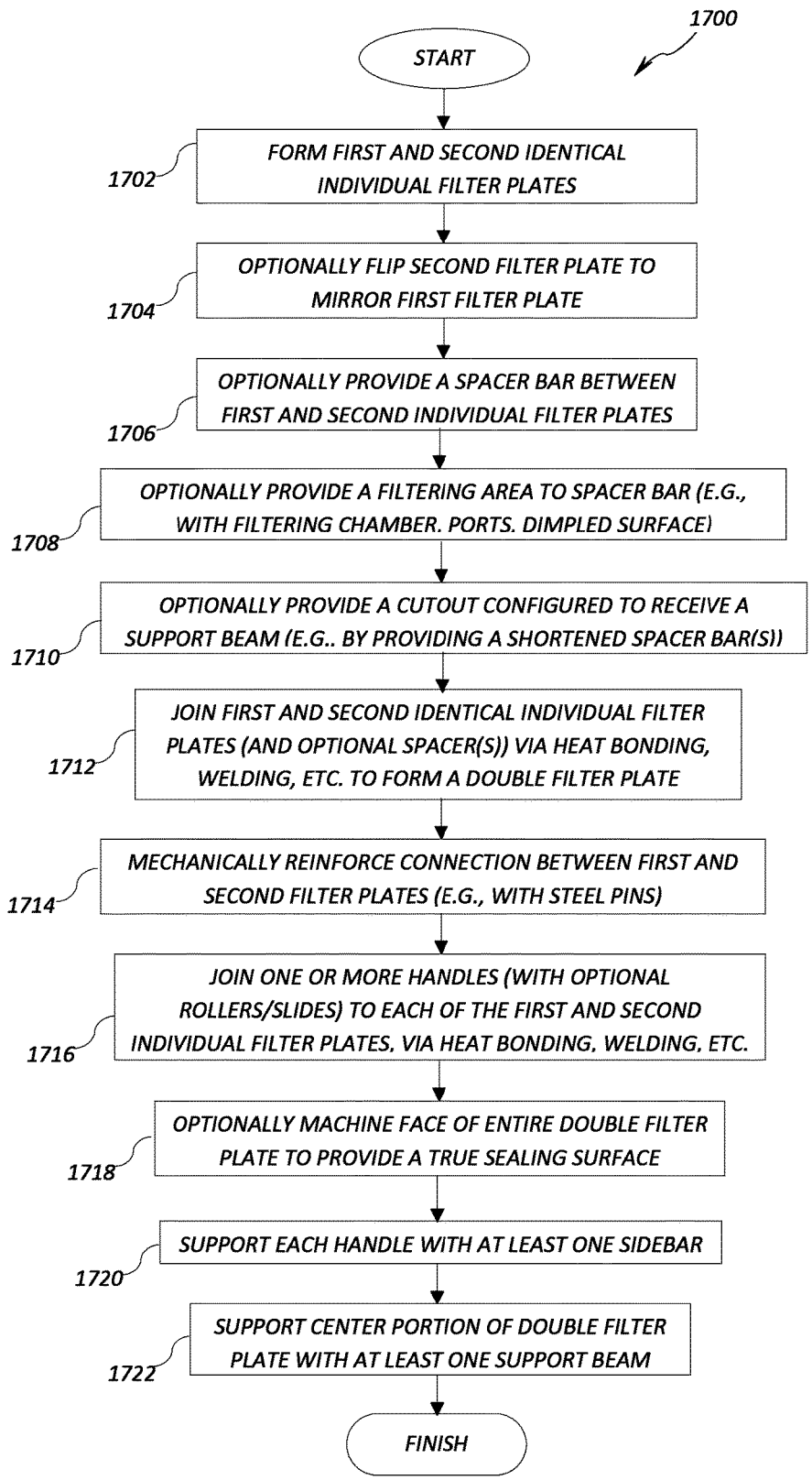
FIG. 31 schematically illustrates a method of manufacturing a double filter plate according to some embodiments of the invention.

FIG. 31 visually depicts a method 1700 of constructing a double filter plate according to certain embodiments of the invention. Two (preferably identical) individual filter plates are provided 1702. Depending on the structural features and symmetry of each of the identical filter plates, one of the individual filter plates may optionally be flipped 180 degrees about a vertical axis with respect to the other individual filter plate 1704. A spacer bar may be provided 1706 to be placed between the individual filter plates. A filtering area may be provided to the spacer bar 1708, for instance, by providing molded-in features such as filtrate ports, stay bosses, filter chambers, recesses, dimpled surfaces, or channels connecting filter chambers of the two individual filter plates. A cutout may be formed 1710 by one or more recesses or other features provided within each individual filter plate, or by providing spacer bars which are shorter than a height of each individual filter plate. The individual filter plates (and spacer bar, if present) are then mechanically joined together 1712, for example via heat or friction bonding, welding, gluing, bolting, mechanical joining (e.g., dovetail), fasteners, connectors, other conventional means for joining, or combinations thereof. A jig or welding fixture (not shown) may be used to ensure that both individual filter plates are joined within the same plane, within predetermined tolerances. Mechanical reinforcement may be provided between joined components 1714 (e.g., between individual filter plates, handles, and spacer bar(s)). Handles may be provided 1716 and may comprise rollers or slides to reduce friction between supporting members such as siderails or one or more support beams. Subsequent machining, grinding, or buffing may be performed 1718 to ensure a true, flat sealing surface on both sides of the double filter plate, and to remove any instances of warping, protuberances, or uneven surfaces. The double filter plate may be installed into a horizontal filter press and supported by its handles resting on one or more sidebars 1720. In addition to the sidebars, at least one other support beam may support a central portion of the double filter plate 1722. For example, the double filter plate may rest on a support beam placed in between and below or level with the sidebars, or the double filter plate may be suspended from a support beam placed in between and positioned above the sidebars.

Figure 33:
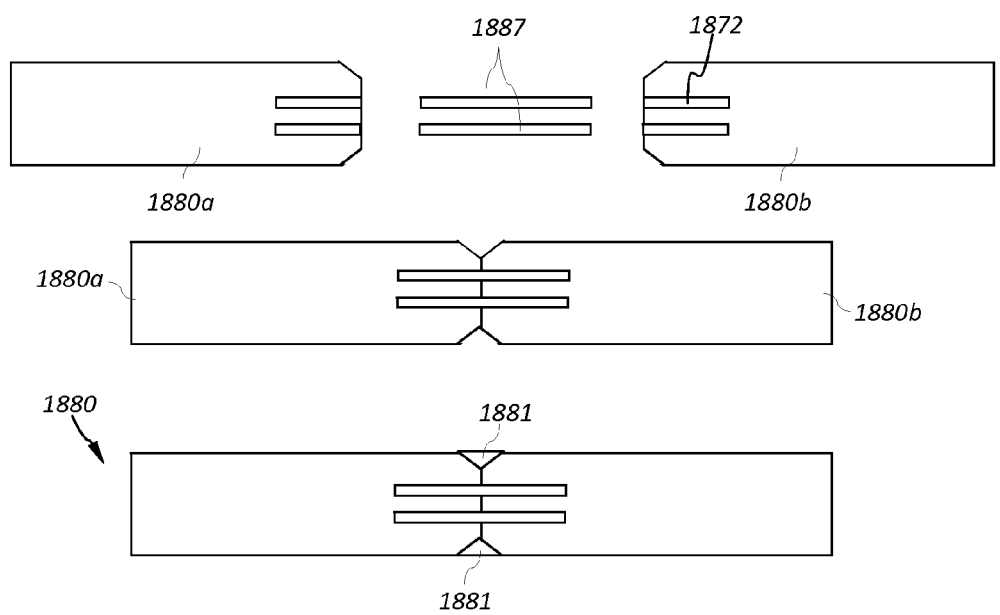
FIGS. 33 and 34 schematically illustrate manufacturing methods for double filter plates according to some embodiments.
Figure 34:
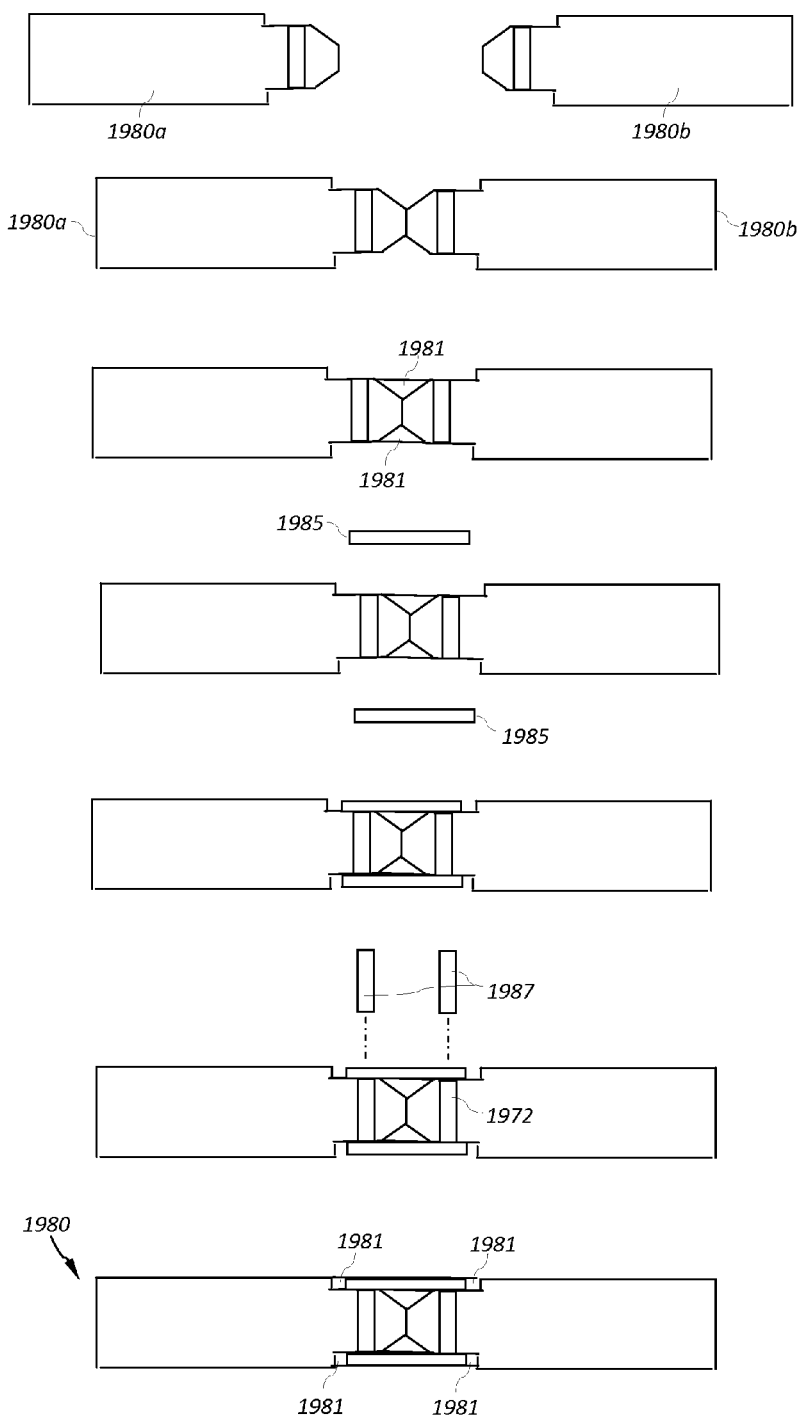

FIGS. 33 and 34 illustrate various methods of attaching two individual filter plates together in order to make a double filter plate. While a spacer bar is not present in the particular embodiments shown, one or more spacer bars could readily be employed by those having an ordinary skill in the art. Turning to FIG. 33, a side view of inner portions of two individual filter plates 1880a, 1880b are shown. Each individual filter plate 1880a, 1880b comprises one or more receiving portions 1872, which may be, for example, any one of a recess, a bore, an aperture, a groove, a blind hole, a threaded hole, a channel, or the like. One or more fasteners 1887, for example, pins, bolts, or expanding dowels are accepted by the receiving portions 1872 in each respective individual filter plate 1880a, 1880b. The resulting combination may be welded together with beads 1881 formed at the junction seams to strengthen the connection to form a double filter plate 1880.

Turning now to FIG. 34, two individual filter plates 1980a, 1980b may be placed in close proximity so as to abut each other. Weld beads 1981 may be placed in chamfers in order to secure the two individual filter plates 1980a, 1980b together. One or more clamping plates 1985 or reinforcing brackets (e.g., a U-shaped bracket) may be arranged in a recess provided between the individual filter plates 1980a, 1980b. The clamping plates 1985 may provide a clamping force between the individual filter plates 1980a, 1980b via one or more fasteners 1987, such as pins, bolts, or expanding dowels. Finally, additional welds beads 1981 may be provided in gaps between the clamping plates 1985 and the individual filter plates 1980a, 1980b to further reinforce the structure of the double filter plate 1980.

Figure 35:
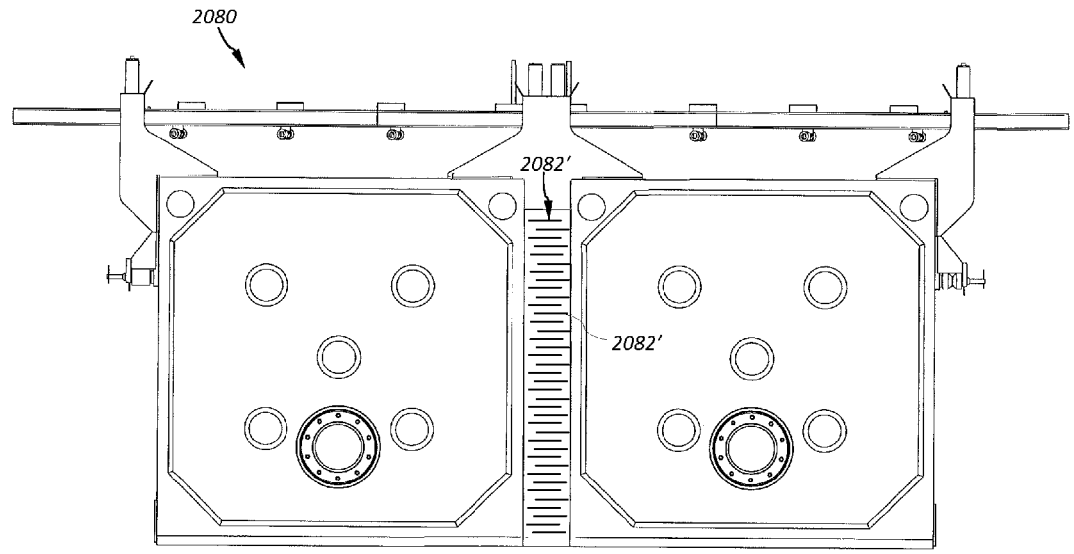
FIGS. 35-37 show various embodiments of a double filter plate, wherein a spacer bar comprises a filtering area having one or more filtration features.
Figure 36:
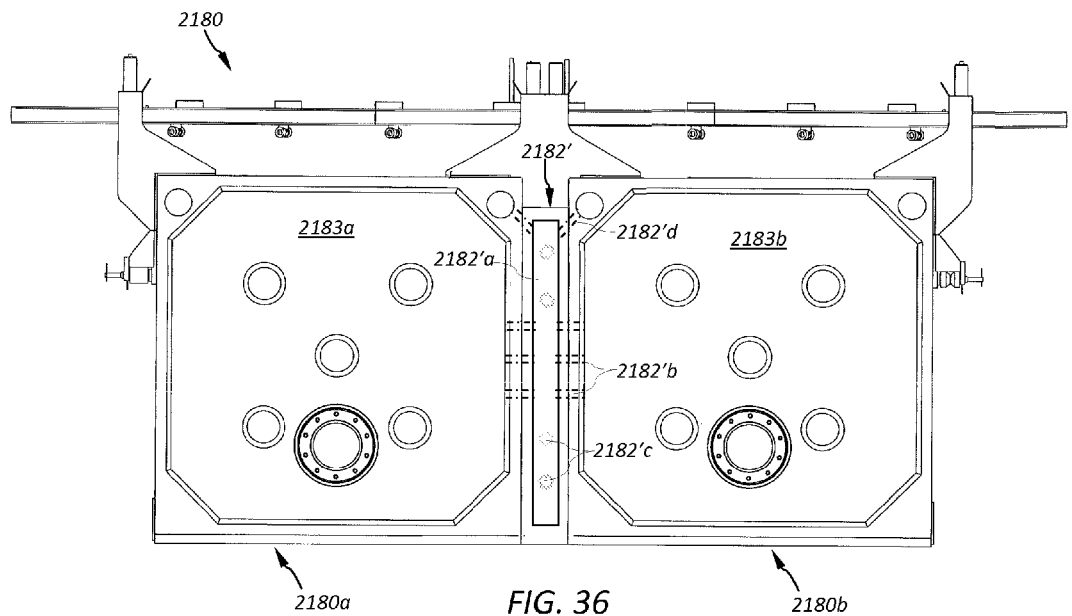
Figure 37:
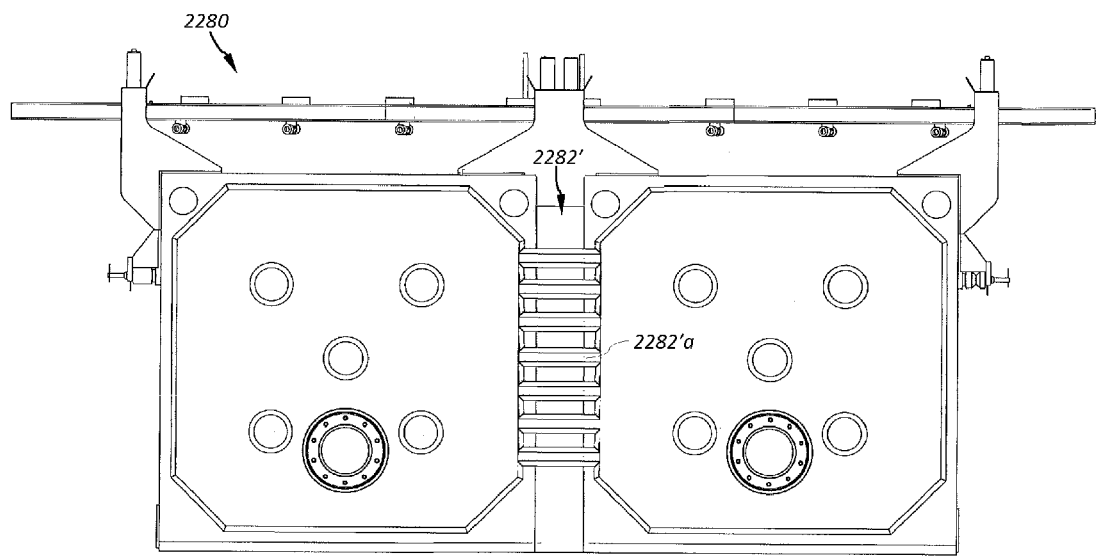

FIG. 35 shows an embodiment of a double filter plate 2080 comprising a spacer bar 2082' having a filtering area, wherein the filtering area comprises a surface having a number of undulations, corrugations, or dimples 2082'a which are configured to support a single filter cloth across the entire double filter plate 2080. FIG. 36 shows an embodiment of a double filter plate 2180 comprising a spacer bar 2182' having a filtering area, wherein the filtering area comprises a filter chamber or recess 2182'a configured to produce a filter cake from slurry. The spacer bar 2182' may in some instances further comprise one or more channels 2182'a configured to transfer slurry between the filter chambers 2183a, 2183b of the individual filter plates 2180a, 2180b. A number of stay bosses 2182'c may be provided to the spacer bar, wherein the stay bosses 2182'c are configured to support a single filter cloth across the entire double filter plate 2180. Moreover, one or more filtrate ports 2182'd may be provided to upper portions of the spacer bar 2182'. FIG. 37 shows an embodiment of a double filter plate 2280 comprising a spacer bar 2282' having a filtering area, wherein the filtering area comprises a surface having a number of grooves 2282'a which are configured to support a single filter cloth across the entire double filter plate 2080.

Figure 38A:
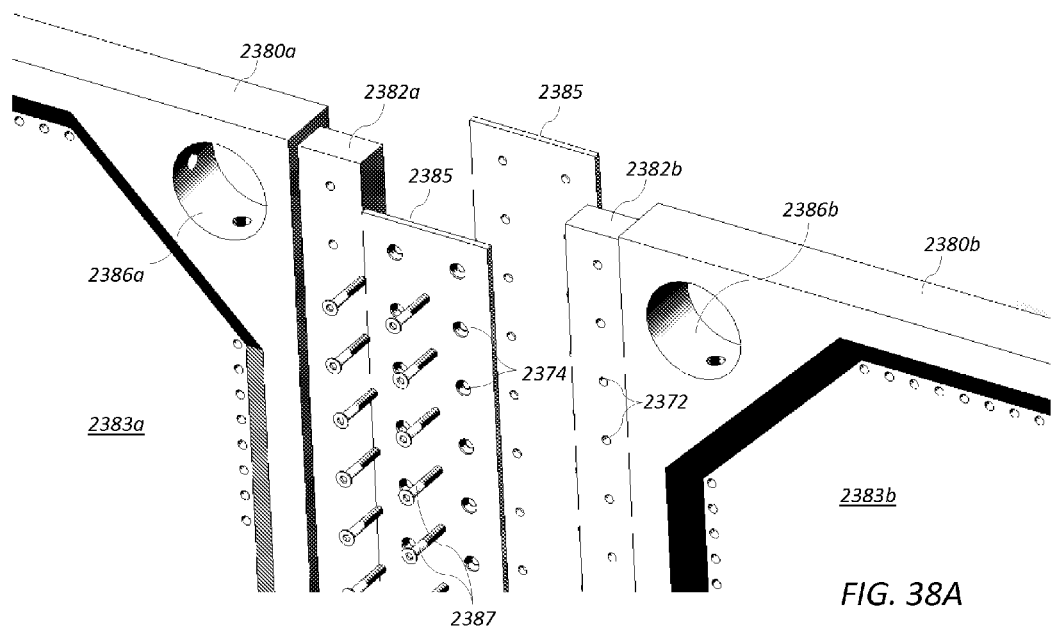
FIGS. 38A and 38B show a double filter plate comprising connections between individual filter plates according to some embodiments; and, FIGS. 39 and 40 show double filter plates having connections between individual filter plates according to yet other embodiments.
Figure 38B:
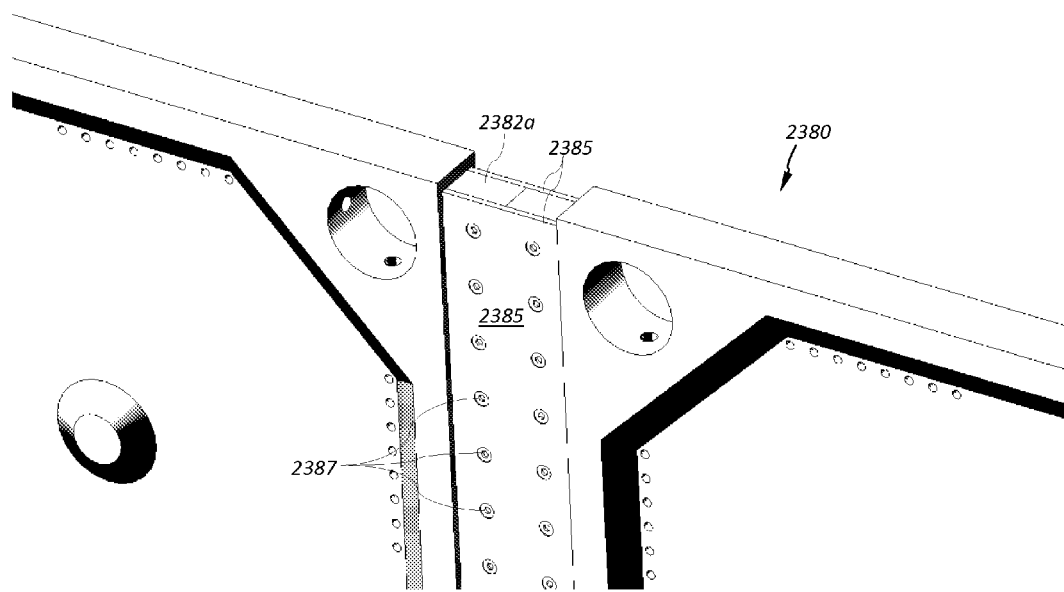

FIGS. 38A and 38B show a double filter plate 2380 comprising a connection system according to some embodiments. The double filter plate 2380 is formed by placing two individual filter plates 2380a, 2380b side-by-side, and then joining. The individual filter plates each comprise a filter chamber 2383a, 2383b, a filtrate port 2386a, 2386b, and an integral spacer bar 2382a, 2382b. The integral spacer bars 2382a, 2382b provided to each of the individual filter plates 2380a, 2380b are aligned as shown, and then two plates 2385 (or a single reinforcing U-shaped bracket or equivalent) are placed on opposing sides of the integral spacer bars 2382a, 2382b. Fasteners 2387 are accepted by receiving portions 2374, 2372 located in the plates 2385 and integral spacer bars 2382a, 2382b, respectively, to join the plates 2385 together and apply a clamping and bonding force to the integral spacer bars 2382a, 2382b therebetween. In the particular embodiment shown, receiving portions 2374, 2372 are a combination of through-holes and threaded holes, wherein at least one of the plates 2385 comprises threaded receiving portions 2374. In some embodiments, while not shown, fasteners 2387 may be weld studs, pins, or deformable members which are welded, glued, swaged, pressed, or otherwise fitted to or bonded into plates 2387 and/or into surfaces within receiving portions 2372. Surfaces within receiving portions 2372 may be "textured" or "patterned" accommodate deformed fastener material, glue, weld solder, self-tapping threads, or the like.

Figure 39:
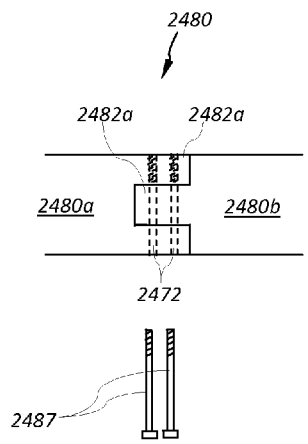

FIG. 39 shows a double filter plate 2480 comprising a tongue-in-groove type connection system according to other embodiments. The double filter plate 2480 is formed by placing two individual filter plates 2480a, 2480b side-by-side, and then joining them together. The individual filter plates 2480a, 2480b each comprise at least one integral spacer bar 2482a, 2482b. The integral spacer bars 2482a, 2482b provided to each of the individual filter plates 2480a, 2480b are aligned as shown, and then a multiplicity of fasteners 2487 are accepted by receiving portions 2472 provided on the integral spacer bars 2482a, 2482b. In the particular embodiment shown, receiving portions 2472 are a combination of through-holes and threaded holes, wherein at least one of the integral spacer bars 2482a, 2482b comprises threaded section. In some embodiments, while not shown, fasteners 2487 may be weld studs, pins, or deformable members which are welded, glued, swaged, pressed, or otherwise fit or bonded into and around receiving portions 2472.

Figure 40:
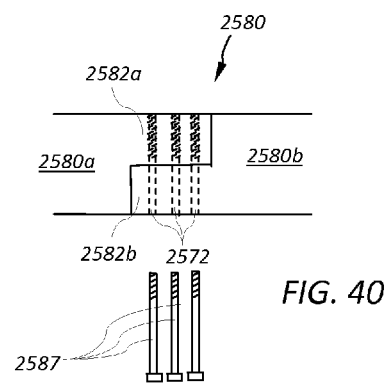

FIG. 40 shows a double filter plate 2580 comprising a lap joint-type connection system according to yet even other embodiments. The double filter plate 2580 is formed by placing two individual filter plates 2580a, 2580b side-by-side, and then joining them together. The individual filter plates 2580a, 2580b each comprise at least one integral spacer bar 2582a, 2582b. The integral spacer bars 2582a, 2582b provided to each of the individual filter plates 2580a, 2580b are aligned as shown, and then a multiplicity of fasteners 2587 are accepted by receiving portions 2572 provided on the integral spacer bars 2582a, 2582b. In the particular embodiment shown, receiving portions 2572 are a combination of through-holes and threaded holes, wherein at least one of the integral spacer bars 2582a, 2582b comprises threaded section. In some embodiments, while not shown, fasteners 2587 may be weld studs, pins, or deformable members which are welded, glued, swaged, pressed, or otherwise fit or bonded into and around receiving portions 2572.

A contractor or other entity may provide a horizontal filter press or double filter plate, or operate a horizontal filter press in whole, or in part, as shown and described. For instance, the contractor may receive a bid request for a project related to designing or operating a horizontal filter press or double filter plate, or the contractor may offer to design such a system or a process for a client. The contractor may then provide, for example, any one or more of the devices or features thereof shown and/or described in the embodiments discussed above. The contractor may provide such devices by selling those devices or by offering to sell those devices. The contractor may provide various embodiments that are sized, shaped, and/or otherwise configured to meet the design criteria of a particular client or customer. The contractor may subcontract the fabrication, delivery, sale, or installation of a component of the devices disclosed, or of other devices used to provide said devices. The contractor may also survey a site and design or designate one or more storage areas for stacking the material used to manufacture the devices. The contractor may also maintain, modify, or upgrade the provided devices. The contractor may provide such maintenance or modifications by subcontracting such services or by directly providing those services or components needed for said maintenance or modifications, and in some cases, the contractor may modify an existing horizontal filter press or conventional filter plate with a "retrofit kit" to arrive at a modified process or double filter plate system comprising one or more method steps, devices, or features of the systems and processes discussed herein.

Although the invention has been described in terms of particular embodiments and applications, one of ordinary skill in the art, in light of this teaching, can generate additional embodiments and modifications without departing from the spirit of or exceeding the scope of the claimed invention.

For example, it is envisaged that filter plates disclosed herein may comprise 4, or 6, or 8, or multiplicities of individual filter plates greater than two. In some preferred embodiments, individual filter plates comprise widths $W_1$, $W_2$ between 2.0 m and 2.5 m and heights $H_1$, $H_2$ between 2.0 m and 2.5 m, creating double filter plates approximately 2.0 m×4.0 m, 2.5 m×4.0 m, 2.0 m×5.0 m, and 2.5 m×5.0 m. In a preferred embodiment, the double filter plates are between approximately 50 and 150 mm, for example, 100 mm thick. Moreover, while not shown, more filter area and cake volume per chamber can be achieved by machining portions of the spacer bars between the individual filter plates to form a filter grid or recess to allow areas between the filter chambers to be used for filtering. In some instances, configuring the spacer bar with useable filtering area could alternatively be accomplished by providing the spacer bar with ports, piping, and molded sections having a pipped surface already incorporated into it, prior to mechanical joining with the individual filter plates. In some instances, separate smaller filter cloths may be utilized (one for each filter chamber of each respective individual filter plate). In other instances, a single one-piece filter cloth may be utilized. In the latter case, the filter cloth spans the entire length and width of the double filter plate. In other examples, welded connections between the two individual filter plates, spacer bar and/or handles may be reinforced with pins (e.g., stainless steel), bolts, or other mechanical fasteners.

Accordingly, it is to be understood that the drawings and descriptions herein are proffered by way of example to facilitate comprehension of the invention and should not be construed to limit the scope thereof.

| Reference numeral identifiers | |
|---|---|
| 10 | Horizontal Filter Press |
| 20 | Support bracket |
| 22, 24 | Connection |
| 23, 43 | Web |
| 26a-c, 86a-c | Filtrate pipe aperture |
| 28 | Base |
| 30 | Follower plate |
| 32, 34 | Handle |
| 38 | Base |
| 40 | Head bracket |
| 44 | Connection |
| 48 | Base |
| 52, 54 | Sidebar |
| 62, 64 | Closure cylinder |
| 66 | Moving crosshead (not shown for clarity) |
| 70 | Support beam |
| 80 | Double filter plate |
| 80a-b | Individual filter plate |
| 81a-b | Feed eye port |
| 82 | Cutout |
| 83a-b | Filter chamber |
| 84a-b | Plate support roller/slide |
| 85a-b | Stay boss |
| 86a-c | Filtrate port (e.g., multi-directional) |
| 87a-b | Sealing surface |
| 88a-b | Bottom |
| 89a-b | Handle |
| 175 | Vertical axis |
| 180 | Double filter plate |
| 180a-b | Individual filter plate |
| 181a-b | Feed eye port |
| 182 | Cutout |
| 182' | Spacer bar |
| 183a-b | Filter chamber |
| 184a-b | Plate support roller/slide |
| 185a-b | Stay boss |
| 186a-c | Filtrate port (e.g., multi-directional) |
| 187a-b | Sealing surface |
| 188a-b | Bottom |
| 189a-b | Handle |
| 180b" | Individual filter plate |
| 184b" | Plate support roller/slide |
| 186b" | Filtrate port (e.g., multi-directional) |
| 189b" | Handle |
| 280 | Double filter plate |
| 280a-b | Individual filter plate |
| 282 | Cutout |
| 282' | Spacer bar |
| 284b | Plate support roller/slide |
| 375 | Vertical axis |
| 380 | Double filter plate |
| 380a-b | Individual filter plate |
| 382' | Spacer bar |
| 389a-b | Handle |
| 475 | Vertical axis |
| 480 | Double filter plate |
| 480a-b | Individual filter plate |
| 489a-b | Handle |
| 580 | Double filter plate |
| 580a-b | Individual filter plate |
| 582' | Spacer bar |
| 583a-b | Filter chamber |
| 675 | Vertical axis |
| 680 | Double filter plate |
| 680a-b | Individual filter plate |
| 682' | Spacer bar |
| 683a-b | Filter chamber |
| $W_1$ | First width |
| $W_2$ | Second width |
| $H_1$ | First height |
| $H_2$ | Second height |
| 740 | Head bracket |
| 742, 744 | Connection |
| 743 | Web |
| 752, 754 | Sidebar |
| 780 | Double filter plate |
| 780a-b | Individual filter plate |
| 781a-b | Feed eye port |
| 782 | Cutout |
| 782' | Spacer bar |
| 783a-b | Filter chamber |
| 784a-b | Plate support roller/slide |
| 785a-b | Stay boss |
| 786a-b | Filtrate port (e.g., multi-directional) |
| 787a, 787b | Sealing surfaces |
| 789a-b | Handle |
| 840 | Head bracket |
| 842, 844 | Connection |

-continued

| Reference numeral identifiers | |
|---|---|
| 843 | Web |
| 848 | Base |
| 852, 854 | Sidebar |
| 870 | Support beam |
| 872 | Plate support roller/slide accommodation feature |
| 875 | Vertical axis |
| 880 | Double filter plate |
| 880a-b | Individual filter plate |
| 881a-b | Feed eye port |
| 883a-b | Filter chamber |
| 884a-c | Plate support roller/slide |
| 885a-b | Stay boss |
| 886a-b | Filtrate port (e.g., multi-directional) |
| 887a-b | Sealing surface |
| 888a-b | Bottom |
| 889a-b | Handle |
| 942, 944 | Connection |
| 943 | Web |
| 948 | Base |
| 952, 954 | Sidebar |
| 970 | Lower support beam |
| 972 | Upper support beam |
| 980 | Double filter plate |
| 980a-b | Individual filter plate |
| 940 | Head bracket |
| 981a-b | Feed eye port |
| 982' | Lower cutout |
| 982' | Spacer bar |
| 982" | Upper cutout |
| 983a-b | Filter chamber |
| 984a-b | Plate support roller/slide |
| 985a-b | Stay boss |
| 986a-b | Filtrate port (e.g., multi-directional) |
| 989a-b | Handle |
| 1040 | Head bracket |
| 1042, 1044 | Connection |
| 1043 | Web |
| 1048 | Base |
| 1052, 1054 | Sidebar |
| 1070 | Support beam |
| 1080 | Double filter plate |
| 1080a-b | Individual filter plate |
| 1081a-b | Feed eye port |
| 1082 | Cutout |
| 1082' | Upper spacer bar |
| 1082" | Lower spacer bar |
| 1083a-b | Filter chamber |
| 1084a-b | Plate support roller/slide |
| 1085a-b | Stay boss |
| 1086a-b | Filtrate port (e.g., multi-directional) |
| 1089a-b | Handle |
| 1170 | Support beam |
| 1180 | Double filter plate |
| 1180a-b | Individual filter plate |
| 1184a | Upper plate support roller/slide |
| 1184b | Lower plate support roller/slide |
| 1189 | Handle |
| 1270 | Support beam |
| 1280 | Double filter plate |
| 1280a-b | Individual filter plate |
| 1284a | Upper plate support roller/slide |
| 1284b | Lower plate support roller/slide |
| 1289 | Handle |
| 1380 | Double filter plate |
| 1380a-b | Individual filter plate |
| 1381a-b | Feed eye port |
| 1470 | Support beam |
| 1480 | Double filter plate |
| 1480a-b | Individual filter plate |
| 1484a | Upper plate support roller/slide |
| 1484b | Lower plate support roller/slide |
| 1489 | Handle |
| 1510 | Horizontal Filter Press |
| 1520 | Support bracket |
| 1522, 1524 | Connection |
| 1528 | Base |
| 1530 | Follower plate |

-continued

| Reference numeral identifiers | |
|---|---|
| 1543 | Web |
| 1542, 1544 | Connection |
| 1548 | Base |
| 1552, 1554 | Sidebar |
| 1562, 1564 | Closure cylinder |
| 1566 | Moving crosshead (not shown for clarity) |
| 1570 | Support beam |
| 1572 | Receiving portion |
| 1580 | Double filter plate |
| 1580a-b | Individual filter plate |
| 1581a-b | Feed eye port |
| 1583a-b | Filter chamber |
| 1584a-c | Plate support roller/slide |
| 1585a-b | Stay boss |
| 1586a-b | Filtrate port (e.g., multi-directional) |
| 1587a-b | Sealing surface |
| 1589a-c | Handle |
| 1610 | Horizontal Filter Press |
| 1620 | Support bracket |
| 1630 | Follower plate |
| 1654 | Sidebar |
| 1662' | Spacer bar |
| 1680 | Double filter plate |
| 1680a-b | Individual filter plate |
| 1681a-b | Feed eye port |
| 1683a-b | Filter chamber |
| 1684a-b | Plate support roller/slide |
| 1685a-b | Stay boss |
| 1686a-b | Filtrate port (e.g., multi-directional) |
| 1689a-c | Handle |
| 1690 | Spray bar |
| 1692 | Spray nozzles |
| 1694a-c | Hoist point connector |
| 1700-1722 | Manufacturing method steps |
| 1872, 1972 | Receiving portion (e.g., hole or recess) |
| 1880, 1980 | Double filter plate |
| 1880a-b, 1980a-b | Individual filter plate |
| 1881, 1981 | Weld bead |
| 1887, 1987 | Fastener (e.g., pin or bolt) |
| 1985 | Plate or reinforcing U-shaped bracket |
| 2080 | Double filter plate |
| 2082' | Spacer bar |
| 2082'a | Undulations/corrugations/dimples |
| 2180 | Double filter plate |
| 2180a, 2180b | Individual filter plate |
| 2183a, 2183b | Filter chamber |
| 2182' | Spacer bar |
| 2182'a | Filter chamber/recess |
| 2182'b | Channel |
| 2182'c | Stay boss |
| 2182'd | Filtrate port |
| 2280 | Double filter plate |
| 2282' | Spacer bar |
| 2282'a | Grooves |
| 2372, 2374 | Receiving portion (e.g., hole or recess) |
| 2380 | Double filter plate |
| 2380a-b | Individual filter plate |
| 2382a-b | Integral spacer bar |
| 2383a-b | Filter chamber |
| 2385 | Plate or reinforcing U-shaped bracket |
| 2386a-b | Filtrate port (e.g., multi-directional) |
| 2387 | Fastener (e.g., pin or bolt) |
| 2472 | Receiving portion (e.g., hole or recess) |
| 2480 | Double filter plate |
| 2480a-b | Individual filter plate |
| 2482a-b | Integral spacer bar |
| 2487 | Fastener (e.g., pin or bolt) |
| 2572 | Receiving portion (e.g., hole or recess) |
| 2580 | Double filter plate |
| 2580a-b | Individual filter plate |
| 2582a-b | Integral spacer bar |
| 2587 | Fastener (e.g., pin or bolt) |

What is claimed is:

1. A double filter plate comprising:
a first individual filter plate having a filter chamber, one or more filtrate ports, at least one feed eye port, a spacer bar integrally provided thereto, a first side of the first individual filter plate comprising a sealing surface and a second side of the first individual filter plate also comprising a sealing surface, a thickness of the first individual filter plate being defined between the sealing surfaces of the first individual filter plate, and at least one handle; wherein a thickness of the spacer bar of the first individual filter plate is less than the thickness of the first individual filter plate;

a second individual filter plate having a filter chamber, one or more filtrate ports, at least one feed eye port, a spacer bar integrally provided thereto, a first side of the second individual filter plate comprising a sealing surface, and a second side of the second individual filter plate also comprising a sealing surface, a thickness of the second individual filter plate being defined between the sealing surfaces of the second individual filter plate, and at least one handle; wherein a thickness of the spacer bar of the second individual filter plate is less than the thickness of the second individual filter plate;

wherein the first and second individual filter plates are initially separate components which are subsequently mechanically joined together to form said double filter plate;

and wherein the spacer bars are welded together to form said double filter plate.

2. The double filter plate according to claim 1, wherein the double filter plate comprises one or more rollers or slides.

3. A horizontal filter press comprising:
a support bracket [1520, 1620];
a head bracket [1540, 1640];
two sidebars [1552, 1554] spanning a distance between said support bracket and said head bracket;
at least one double filter plate comprising a first individual filter plate having a filter chamber, one or more filtrate ports, at least one feed eye port, a spacer bar integrally provided thereto, a first side of the first individual filter plate comprising a sealing surface and a second side of the first individual filter plate also comprising a sealing surface, a thickness of the first individual filter plate being defined between the sealing surfaces of the first individual filter plate, and at least one handle; wherein a thickness of the spacer bar of the first individual filter plate is less than the thickness of the first individual filter plate; and a second individual filter plate having a filter chamber, one or more filtrate ports, at least one feed eye port, a spacer bar, integrally provided thereto, a first side of the second individual filter plate comprising a sealing surface and a second side of the second individual filter plate also comprising a sealing surface, a thickness of the second individual filter plate being defined between the sealing surfaces of the second individual filter plate, and at least one handle; wherein a thickness of the spacer bar of the second individual filter plate is less than the thickness of the second individual filter plate; wherein the first and second individual filter plates are initially separate components which are subsequently mechanically joined together to form said at least one double filter plate; and wherein the spacer bars are welded together to form said double filter plate.

4. The horizontal filter press according to claim 3, wherein the at least one double filter plate comprises one or more rollers or slides.

5. A method of manufacturing a double filter plate comprising:
providing a first separate individual filter plate having a first filter chamber, one or more first filtrate ports, at least one feed eye port, a spacer bar integrally provided thereto, a first side of the first individual filter plate comprising a sealing surface and a second side of the first individual filter plate comprising a sealing surface, a thickness of the first individual filter plate being defined between the sealing surfaces of the first individual filter plate, and at least one handle; wherein a thickness of the spacer bar of the first individual filter plate is less than the thickness of the first individual filter plate;

providing a second separate individual filter plate having a filter chamber, one or second filtrate ports, at least one feed eye port, a spacer bar integrally provided thereto, a first side of the second individual filter plate comprising a sealing surface and a second side of the second individual filter plate comprising a sealing surface, a thickness of the second individual filter plate being defined between the sealing surfaces of the second individual filter plate, and at least one handle; wherein a thickness of the spacer bar of the second individual filter plate is less than the thickness of the second individual filter plate; and mechanically joining the first and second separate individual filter plates together, wherein the first and second separate individual filter plates are initially separate components which are subsequently mechanically joined together to form a double filter plate; and wherein the spacer bars are welded together to form said double filter plate.

6. The method according to claim 5, further comprising providing one or more rollers or slides to the double filter plate.

* * * * *